US012801183B2

(12) United States Patent
Nguyen et al.

(10) Patent No.: US 12,801,183 B2
(45) Date of Patent: *Nov. 17, 2026

(54) ELECTRONIC DEVICE INCLUDING A COMPOSITE ENCLOSURE COMPONENT HAVING LOCALIZED METAL NANOPARTICLES

(71) Applicant: Apple Inc., Cupertino, CA (US)

(72) Inventors: Que Anh S. Nguyen, San Jose, CA (US); Weidi Zhu, Milpitas, CA (US); Andi M. Limarga, Cupertino, CA (US); Nisha S. Sheth, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 18/239,640

(22) Filed: Aug. 29, 2023

(65) Prior Publication Data

US 2024/0094777 A1 Mar. 21, 2024

Related U.S. Application Data

(60) Provisional application No. 63/408,523, filed on Sep. 21, 2022.

(51) Int. Cl.

| | |
|---|---|
| ***G06F 1/16*** | (2006.01) |
| ***H01Q 1/24*** | (2006.01) |
| ***H04M 1/02*** | (2006.01) |

(52) U.S. Cl.

CPC .......... *G06F 1/1656* (2013.01); *G06F 1/1686* (2013.01); *H01Q 1/243* (2013.01); *H04M 1/0264* (2013.01)

(58) Field of Classification Search

CPC ......... G06F 2203/04103; G06F 3/0443; G06F 3/0446; G06F 1/1656; G06F 3/041;

(Continued)

(56) References Cited

U.S. PATENT DOCUMENTS

| | | | |
|---|---|---|---|
| 6,157,426 | A | 12/2000 | Gu et al. |
| 10,444,408 | B2 | 10/2019 | Bellman et al. |

(Continued)

FOREIGN PATENT DOCUMENTS

| | | |
|---|---|---|
| CN | 101533199 | 9/2009 |
| CN | 101798179 | 8/2010 |

(Continued)

OTHER PUBLICATIONS

Heinz et al., "Excimer Laser Induced Spatially Resolved Formation and Implantation of Plasmonic Particles in Glass," Nanomaterials 8, 1035, 10 pages, 2018.

(Continued)

*Primary Examiner* — Ajibola A Akinyemi

(74) *Attorney, Agent, or Firm* — Brownstein Hyatt Farber Schreck, LLP

(57) ABSTRACT

A composite enclosure component for an electronic device is disclosed. The composite enclosure component may include metallic nanoparticles, non-metallic nanoparticles, or a combination of these. The nanoparticles of the composite enclosure component may provide a hue, enhanced mechanical properties, or both.

20 Claims, 15 Drawing Sheets

(58) Field of Classification Search
CPC ........ G06F 3/0412; G06F 3/042; G06F 3/044; G06F 3/0445; G06F 3/045; G06F 1/163; G06F 1/1652; G06F 1/1686
USPC ........................................................ 455/556.1
See application file for complete search history.

(56) References Cited

U.S. PATENT DOCUMENTS

| | | | |
|---|---|---|---|
| 10,547,717 | B2 | 1/2020 | Hill et al. |
| 11,497,121 | B2 | 11/2022 | Lee et al. |
| 11,632,448 | B2 | 4/2023 | Baker et al. |
| 12,088,748 | B2 | 9/2024 | Zhang et al. |
| 12,445,706 | B2 | 10/2025 | Hill et al. |
| 2007/0206263 | A1 | 9/2007 | Neuman et al. |
| 2009/0020215 | A1 | 1/2009 | Hood et al. |
| 2009/0051277 | A1 | 2/2009 | Inoue et al. |
| 2009/0178704 | A1 | 7/2009 | Kalejs et al. |
| 2011/0188180 | A1 | 8/2011 | Pakula et al. |
| 2011/0227487 | A1 | 9/2011 | Nichol et al. |
| 2011/0273906 | A1 | 11/2011 | Nichol et al. |
| 2012/0287674 | A1 | 11/2012 | Nichol et al. |
| 2014/0009816 | A1 | 1/2014 | Ma et al. |
| 2014/0154440 | A1 | 6/2014 | Iida et al. |
| 2014/0184057 | A1* | 7/2014 | Kim ...................... G06F 1/1626 313/504 |
| 2014/0277294 | A1 | 9/2014 | Jones et al. |
| 2015/0130896 | A1 | 5/2015 | Ma et al. |
| 2016/0011340 | A1 | 1/2016 | Hong et al. |
| 2016/0054762 | A1 | 2/2016 | Garelli et al. |
| 2017/0068021 | A1 | 3/2017 | Wilson et al. |
| 2017/0336831 | A1 | 11/2017 | Zhang et al. |
| 2018/0203180 | A1 | 7/2018 | Horner et al. |
| 2018/0362390 | A1 | 12/2018 | Claireaux et al. |
| 2019/0067394 | A1 | 2/2019 | Cheon et al. |
| 2019/0169061 | A1 | 6/2019 | Jones et al. |
| 2020/0022601 | A1 | 1/2020 | Rogers et al. |
| 2020/0097044 | A1 | 3/2020 | Kim et al. |
| 2020/0153203 | A1 | 5/2020 | Hatzilias et al. |
| 2020/0282424 | A1 | 9/2020 | Oralkan et al. |
| 2020/0301052 | A1 | 9/2020 | Sugihara et al. |
| 2020/0348559 | A1 | 11/2020 | Zhao et al. |
| 2021/0014992 | A1 | 1/2021 | Limarga et al. |
| 2021/0036047 | A1 | 2/2021 | Heo et al. |
| 2021/0122671 | A1 | 4/2021 | Hart et al. |
| 2021/0142030 | A1 | 5/2021 | Gupta et al. |
| 2021/0168225 | A1 | 6/2021 | Bates et al. |
| 2021/0168230 | A1 | 6/2021 | Baker et al. |
| 2021/0181020 | A1 | 6/2021 | McQuilkin et al. |
| 2021/0335901 | A1 | 10/2021 | Hu et al. |
| 2021/0347145 | A1* | 11/2021 | Bang ........................ B32B 17/10 |
| 2022/0140283 | A1 | 5/2022 | Kim et al. |
| 2022/0215215 | A1 | 7/2022 | Sugihara et al. |
| 2022/0317340 | A1 | 10/2022 | Amin et al. |
| 2022/0402807 | A1 | 12/2022 | Guo et al. |
| 2023/0011603 | A1 | 1/2023 | Choi et al. |
| 2023/0056403 | A1* | 2/2023 | Nguyen .............. H04M 1/0264 |
| 2023/0091991 | A1 | 3/2023 | Spencer et al. |
| 2023/0221782 | A1 | 7/2023 | Hurrell et al. |
| 2023/0224388 | A1 | 7/2023 | Bates et al. |
| 2023/0224393 | A1 | 7/2023 | Froese et al. |
| 2023/0421679 | A1 | 12/2023 | Xu et al. |
| 2024/0094777 | A1* | 3/2024 | Nguyen ................ G06F 1/1686 |
| 2024/0098168 | A1 | 3/2024 | Nguyen et al. |
| 2024/0098921 | A1 | 3/2024 | Nguyen et al. |

FOREIGN PATENT DOCUMENTS

| | | |
|---|---|---|
| CN | 206393805 | 8/2017 |
| CN | 108640528 | 10/2018 |
| CN | 109411646 | 3/2019 |
| CN | 108277463 | 3/2020 |
| CN | 110933202 | 3/2020 |
| CN | 111848160 | 10/2020 |
| CN | 114911151 | 8/2022 |
| EP | 0565835 | 5/1999 |
| EP | 3716589 | 9/2020 |
| WO | WO2021/236780 | 11/2021 |

OTHER PUBLICATIONS

Ono et al., "Higher Toughness of Metal-nanoparticle-implanted Sodalime Silicate Glass with Increased Ductility," Scientific Reports, 9:15387, www.nature.com/scientificreports, 11 pages, 2019.
Ono et al., "Tuning the mechanical toughness of the metal nanoparticle-implanted glass: The affect of nanoparticle growth conditions," J. Am. Ceram Soc., 104, 1 page, 2021.
Qiu et al., Manipulation of Gold Nanoparticles Inside Transparent Materials, Angew. Chem. Int. Ed, 43, 2230-2234, 2004.
Vogel, Werner, "Glass Chemistry," 2nd Edition, Springer-Verlag, 25 pages, 1985.

* cited by examiner

ELECTRONIC DEVICE INCLUDING A COMPOSITE ENCLOSURE COMPONENT HAVING LOCALIZED METAL NANOPARTICLES

CROSS-REFERENCE TO RELATED APPLICATION(S)

This application is a nonprovisional application of and claims the benefit of U.S. Provisional Patent Application No. 63/408,523, filed Sep. 21, 2022, and titled "Electronic Device Including a Composite Enclosure Component Having Localized Metal Nanoparticles," the disclosure of which is hereby incorporated herein by reference in its entirety.

FIELD

The described embodiments relate generally to electronic devices that include a composite enclosure component. More particularly, the present embodiments relate to enclosure components formed from a composite material including a glass-based material and a particulate reinforcement.

BACKGROUND

Some modern day portable electronic devices may include a wireless communication system and/or a wireless charging system. Typically, such wireless communication and/or charging systems are positioned within the enclosure of the electronic device. Embodiments described herein are directed to electronic device enclosures that include composite enclosure components including a glass-based material. The composite enclosure components described herein may have advantages as compared to some traditional electronic device enclosures.

SUMMARY

Embodiments described herein relate generally to composite enclosure components for electronic devices. The composite enclosure components described herein typically include a composite material having a matrix of a glass-based material. For example, the composite material may be a toughened and colored glass-based material. As an example, the glass-based material may be toughened and colored by one or more sets of nanoparticles embedded in the glass-based material. Enclosures and electronic devices including these composite enclosure components are also described herein.

In some embodiments, the composite enclosure component includes a nanophase in the form of nanoparticles that acts as both a coloring agent and as a reinforcement. The composite material may include a matrix of a glass-based material and the nanoparticles may be dispersed within the glass-based material. The glass-based material may be a glass material, a glass-ceramic material, or a combination of these. In some examples, the nanophase may be in the form of metallic nanoparticles that act both as a coloring agent and as a reinforcement.

In additional embodiments, the composite enclosure component includes nanoparticles that act as a reinforcement, but that have little effect on the color of the composite enclosure component. As previously described, the nanoparticles may be distributed within a glass-based material. For example, a composite enclosure component may include non-metallic nanoparticles, such as semiconductor nanoparticles, which act as a reinforcement but that have little effect on the color. The non-metallic nanoparticles may be used alone or in combination with metallic nanoparticles to reinforce the glass-based material.

In some cases, the enclosure component may be formed from the composite material, so that the composite material makes up a whole of the component. In additional cases, only a portion of the enclosure component may include the composite material. For example, a toughened glass-based material may be positioned at regions of the enclosure component that would benefit from additional impact resistance.

The composite enclosure components described herein can have both particular optical properties and impact resistance. In some cases, all or part of the composite enclosure component may have optical properties suitable for use over with one or more internal components of the electronic device. For example, a portion of the enclosure component provided over a display may have a transmission value higher than that of a portion of the enclosure component including the composite material that surrounds the display. The optical properties may include one or more of a color value, a transmission value, an absorption value, or a refractive index. The transmission value may be measured over a visible wavelength range or an infrared (IR) wavelength range.

In further examples, the composite enclosure components described herein may have electrical and/or magnetic properties suitable for use with an internal component of the electronic device. For example, all or part of the enclosure component may be configured to have dielectric properties suitable for use over a component of a wireless communication system. In addition, all or part of the enclosure component may be configured to have magnetic properties suitable for use over a component of a wireless charging system.

In embodiments, the composite enclosure components described herein provide a balance between two or more of optical properties, electrical properties, magnetic properties, and mechanical properties. For example, when the toughened and colored glass material of the enclosure component includes metallic nanoparticles that acts as both coloring and toughening agents, the composition and/or location(s) of the toughened and colored glass material may be configured so that the presence of the metallic nanoparticles does not unduly interfere with operation of an internal component of the electronic device.

The disclosure provides an electronic device comprising a display and an enclosure comprising a housing defining a side surface of the enclosure and a cover assembly coupled to the housing. A composite cover member of the cover assembly defines a central region positioned over the display and comprising a first glass-based material and a peripheral region at least partially surrounding the central region and comprising a second glass-based material and nanoparticles embedded in the second glass-based material, the peripheral region having a greater concentration of the nanoparticles than the central region.

The disclosure also provides an electronic device comprising a display, a radio-frequency antenna assembly, and an enclosure surrounding the display and the radio-frequency antenna assembly and comprising a housing defining a side surface of the enclosure and a rear cover coupled to the housing and including a composite cover member. The composite cover member comprises a first region positioned over the radio-frequency antenna assembly and comprising a first glass-based material and a second region surrounding the first region and comprising a second glass-based material and a set of nanoparticles dispersed in the second glass-based material, the second region having a greater dielectric constant than the first region due, at least in part, to the set of nanoparticles.

The disclosure also provides an electronic device comprising an enclosure comprising a composite cover member and an electronic component positioned within the enclosure. The composite cover member defines a first region comprising a first glass material, the electronic component at least partially positioned below the first region, and a second region including a set of nanoparticles dispersed in a second glass material, the second region having a greater toughness than the first region due at least in part to the set of nanoparticles.

BRIEF DESCRIPTION OF THE DRAWINGS

The disclosure will be readily understood by the following detailed description in conjunction with the accompanying drawings, wherein like reference numerals designate like elements.

Figure 1A:
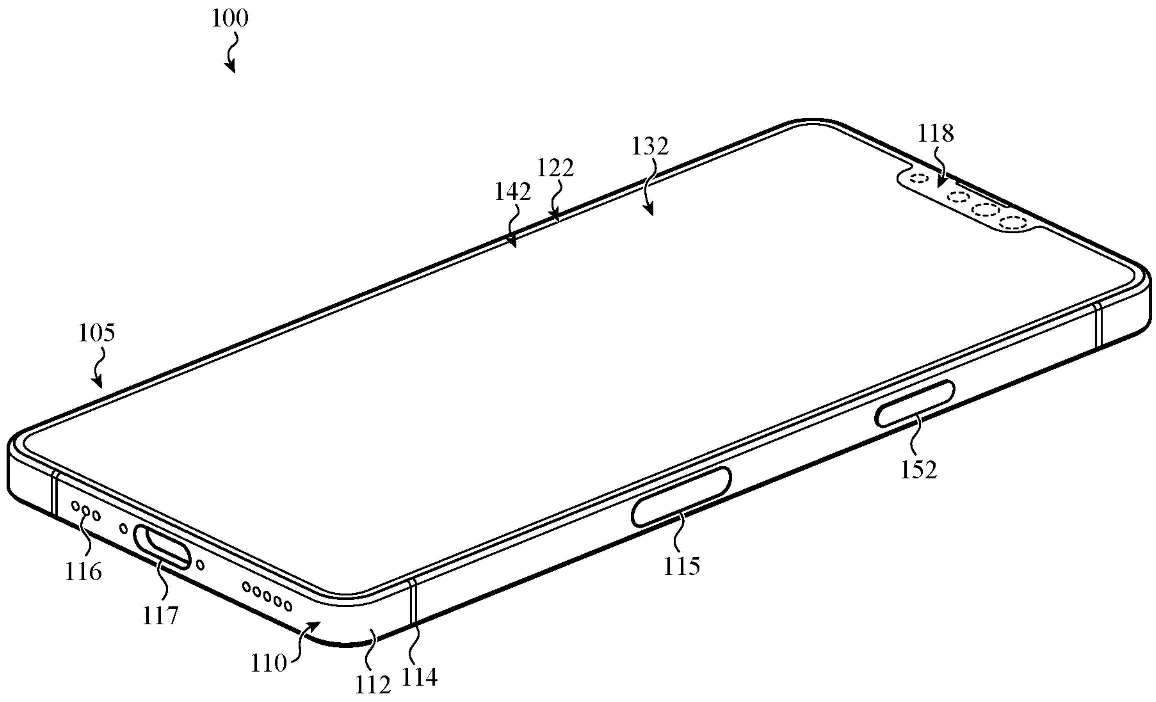
FIGS. 1A and 1B show views of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments described herein relate generally to composite enclosure components for electronic devices. The composite enclosure components described herein typically include a composite material having a matrix of a glass-based material. For example, the composite material may be a toughened and colored glass-based material. As an example, the glass-based material may be toughened and colored by one or more nanophases embedded in the glass-based material. Enclosures and electronic devices including these composite enclosure components are also described herein.

In some embodiments, the composite enclosure component includes a nanophase in the form of nanoparticles that act as both a coloring agent and as a reinforcement. The composite material may include a matrix of a glass-based material and the nanoparticles may be dispersed within the glass-based material. The glass-based material may be a glass material, a glass-ceramic material, or a combination of these. In some examples, the nanoparticles may be metallic nanoparticles that act both as a coloring agent and as a reinforcement. The enclosure component may alternately be referred to as a nanoparticle doped glass-based enclosure component.

In additional embodiments, the composite enclosure component includes nanoparticles that act as a reinforcement, but that have little effect on the color of the composite enclosure component. As previously described, these nanoparticles may be distributed within a glass-based material. For example, a composite enclosure component may include non-metallic nanoparticles, such as semiconductor nanoparticles, which act as a reinforcement but that have little effect on the color. The non-metallic nanoparticles may be used alone or in combination with metallic nanoparticles to reinforce the glass-based material.

In some cases, the enclosure component may be formed from the composite material, so that the composite material makes up a whole of the component. In additional cases, only a portion of the enclosure component may include the composite material. For example, a toughened glass-based material may be positioned at regions of the enclosure component that would benefit from additional impact resistance.

The composite enclosure components described herein can have both particular optical properties and impact resistance. In some cases, all or part of the composite enclosure component may have optical properties suitable for use over with one or more internal components of the electronic device. For example, a portion of the enclosure component provided over a display may have a transmission value higher than that of a portion of the enclosure component including the composite material that surrounds the display. The optical properties may include one or more of a color value, a transmission value, or an absorption value. The transmission value may be measured over a visible wavelength range or an infrared (IR) wavelength range.

In further examples, the composite enclosure components described herein may have electrical and/or magnetic properties suitable for use with an internal component of the electronic device. For example, all or part of the enclosure component may be configured to have dielectric properties suitable for use over a component of a wireless communication system. In addition, all or part of the enclosure component may be configured to have magnetic properties suitable for use over a component of a wireless charging system.

In embodiments, the composite enclosure components described herein provide a balance between two or more of optical properties, electrical properties, magnetic properties, and toughness. For example, when the toughened and colored glass material of the enclosure component includes metallic nanoparticles that acts as both coloring and toughening agents, the composition and/or location(s) of the toughened and colored glass material may be configured so that the presence of the metallic nanoparticles does not unduly interfere with operation of an internal component of the electronic device.

These and other embodiments are discussed below with reference to FIGS. 1A-11. However, those skilled in the art will readily appreciate that the detailed description given herein with respect to these figures is for explanatory purposes only and should not be construed as limiting.

Figure 1B:
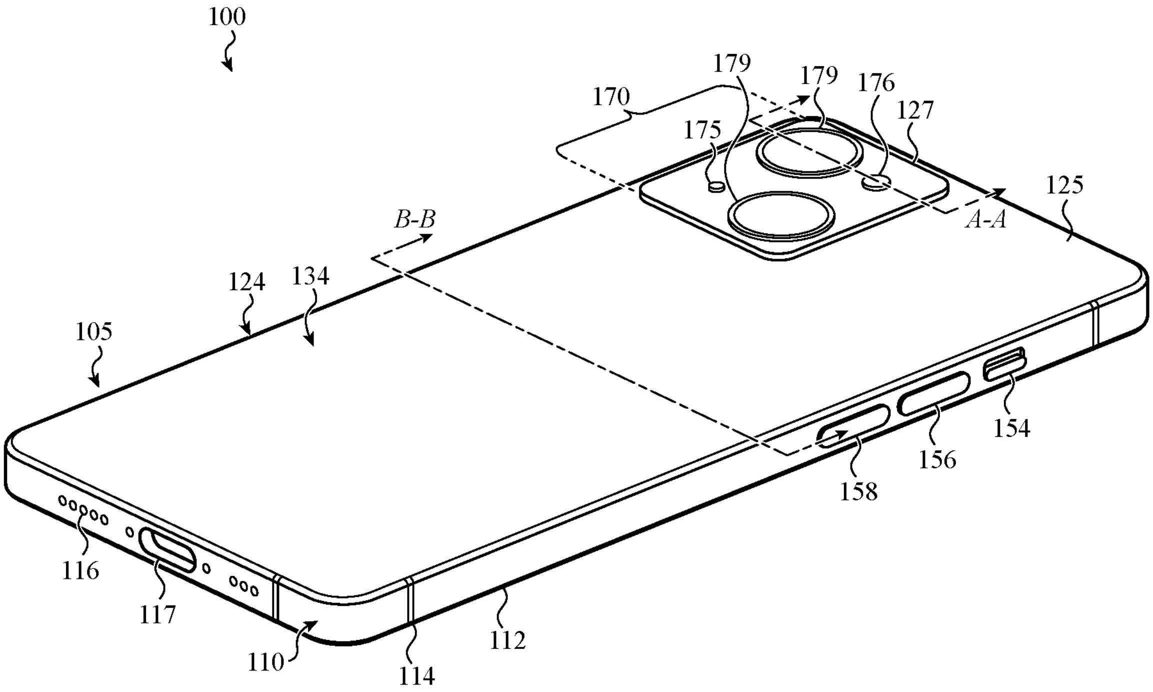

FIGS. 1A and 1B show an example of an electronic device or simply "device" 100. For purposes of this disclosure, the device 100 may be a portable electronic device including, for example a mobile phone, a tablet computer, a portable computer, a laptop, a wearable electronic device, a portable music player, a health monitoring device, a portable terminal, a wireless charging device, a device accessory, or other portable or mobile device.

As shown in FIGS. 1A and 1B, the electronic device 100 includes an enclosure 105. The enclosure 105 includes a front cover assembly 122, a rear cover assembly 124, and an enclosure component 110. Internal components of the device may be at least partially enclosed by the front and rear cover assemblies 122, 124 and the enclosure component 110 and, in some cases, may be positioned within an internal cavity defined by the enclosure (e.g., 201 of FIG. 2). The example of FIGS. 1A and 1B is not limiting and in other examples internal components of the device may be enclosed by an enclosure component in combination with a unitary cover or any other suitable configuration. A unitary cover may be formed from a single piece of material and may alternately be referred to as a monolithic cover.

The enclosure 105 includes one or more composite cover members. The composite enclosure components described herein typically include a composite material including a glass-based material that defines a matrix of the composite material. The glass-based material may be a glass material, a glass-ceramic material, or a combination of these. In some instances, the composite material may include one or more nanophases embedded in the glass-based material. The nanophases may impart toughness and/or color to the composite cover member. Each of the nanophases may be in the form of nanoparticles. In some examples, the one or more nanophases may be in the form of metallic nanoparticles, non-metallic nanoparticles, or combinations thereof. Additional description of composite materials is provided with respect to FIG. 4B and, for brevity, that description is not repeated here. In some examples, the enclosure 105 includes first and second composite cover members, such as front and rear composite cover members.

In some embodiments, the composite cover member may be formed from the composite material, so that the composite material makes up a whole of the cover member. In additional cases, only a portion of the cover member may include the composite material. For example, the composite material may be positioned at regions of the cover member that would benefit from additional impact resistance. The composite cover member may be positioned over one or more internal components of the electronic device 100 such a display, a radio-frequency (RF) antenna assembly (which may be a directional antenna assembly), a component for an inductive coupling wireless charging system, an optical component of a sensor or camera assembly, or the like.

The front cover assembly 122 may at least partially define a front surface of the electronic device. In the example of FIG. 1A, the front cover assembly defines a substantial entirety of the front surface of the electronic device. In the example of FIG. 1A, the front cover assembly 122 includes a cover member 132 (also referred to herein as a front cover member), which may be a composite cover member as described herein that includes metallic nanoparticles, non-metallic nanoparticles, or both. The cover member 132 may extend laterally across the cover assembly 122, such as substantially across the width and the length of the cover assembly. The front cover assembly 122 may also include an exterior coating such as an oleophobic coating and/or an anti-reflective coating. The front cover assembly 122 may also define an opening, which may be positioned over a speaker or another internal device. Alternately or additionally the front cover assembly 122 may include an interior coating such as a masking layer which provides an opaque portion of the front cover assembly 122. These exterior and/or interior coatings may be disposed on the cover member 132. In addition, the front cover assembly may include a mounting frame which is coupled to an interior surface of the cover member 132 and to the enclosure component 110.

The front cover assembly 122 may be positioned over one or more electronic components of the electronic device. For example, the front cover assembly 122 is positioned over a display 142, also shown in the cross-section view of FIG. 3. The front cover assembly 122 of FIG. 1A is also positioned over a front sensing array 118, with the components of the front sensing array shown with dashed lines.

In embodiments, the front cover assembly 122 is substantially transparent or includes one or more substantially transparent portions over the display 142 and/or an optical component configured to operate over a visible wavelength range (e.g., an optical component of the front sensing array 118). As referred to herein, a component or material is substantially transparent when light is transmitted through the material and the extent of scattering is low. The front cover assembly 122 may also be configured to have electrical properties and/or magnetic properties compatible with one or more internal components of the electronic device.

Typically, the cover member 132 is substantially transparent or includes one or more substantially transparent portions over a display and/or an optical component configured to operate over a visible wavelength range. The cover member 132 may also include one or more translucent and/or opaque portions in combination with the one or more substantially transparent portions. For example, the transmission of the cover member 132 (or the transparent portions thereof) may be at least 85%, 90%, or 95% over a visible wavelength range (e.g., the visible spectrum), and the haze may be less than about 5% or 1%. This transmission value may be an average value.

In addition, the cover member 132 or portions of the cover member 132 positioned over a display or optical module may be configured to have a sufficiently neutral color that the optical input to the optical module and/or the optical output provided by the display 142 is not significantly degraded. For example, these portions of the front cover member may be described by an L* value of 90 or more, an a* value having a magnitude (alternately, absolute value) less than 0.5, and a b* value having a magnitude less than 1.

The cover member 132 may also be configured to have additional optical properties, electrical properties, and/or magnetic properties compatible with one or more internal components of the electronic device. For example, the cover member 132 may be configured to provide infrared (IR) transmission suitable for use over an optical component configured to produce images from infrared light (e.g., near-IR light). In some cases, the cover member 132 may have a transmission value of at least 85%, 90%, or 95% over an infrared wavelength range (e.g., from 770 nm to 1000 nm). These transmission values may be average values over the infrared wavelength range. As an additional example, cover member 132 may be configured to provide electrical properties suitable for use over a component of a wireless communication system. For example, the cover member 132 may be a dielectric cover member and may be formed from a material having a dielectric constant and a dissipation factor sufficiently low to allow transmission of RF or IR (e.g., near-IR) signals through the cover member. In some examples, the cover member 132 may define an opening over one or more internal components of the electronic device, such as an optical module of a camera assembly or a sensor assembly.

In some embodiments, the cover member 132 is a composite cover member as described herein that includes metallic nanoparticles, non-metallic nanoparticles, or both. In other cases, cover member 132 may lack the nanoparticles of the composite covers described herein and may be formed from a glass material, a polymer material, a ceramic material, or a combination thereof. In some embodiments, the cover member 132 has a thickness less than 3 mm, less than or equal to 2 mm, less than or equal to 1 mm, from about 250 microns to about 1 mm, or from about 500 microns to about 1 mm.

The rear cover assembly 124 may at least partially define a rear surface of the electronic device. In the example of FIG. 1B, the rear cover assembly 124 defines a substantial entirety of the rear surface of the electronic device. The rear cover assembly 124 includes a cover member 134, which may be a composite cover including metallic nanoparticles, non-metallic nanoparticles, or both. The exterior surface of the rear cover member 134 may have a texture that produces a glossy effect, a matte effect, or combination of these. The rear cover assembly 124 may also include one or more coatings. For example, the rear cover assembly 124 may include an exterior coating such as a smudge-resistant (e.g., oleophobic) coating. Alternately or additionally, the rear cover assembly 124 may include one or more interior coatings which provide a decorative effect, such as a color layer, a multilayer interference stack, or a metal layer. Additional description of interior coatings is provided with respect to FIG. 2. These exterior and/or interior coatings may be disposed on the cover member 134. In addition, the rear cover assembly 124 may include a mounting frame which is coupled to an interior surface of the cover member 134 and to the enclosure component 110. In some cases, the rear cover assembly 124 is positioned over an electronic component, such as a wireless charging component or a wireless communication component, as illustrated in the cross-section view of FIG. 3. In some examples, the cover member 134 may define an opening over one or more internal components of the electronic device, such as an optical module of a camera assembly or a sensor assembly. In these examples, the rear cover assembly 124 may also include at least one (optically) transparent window member positioned over the opening(s).

Figure 2:
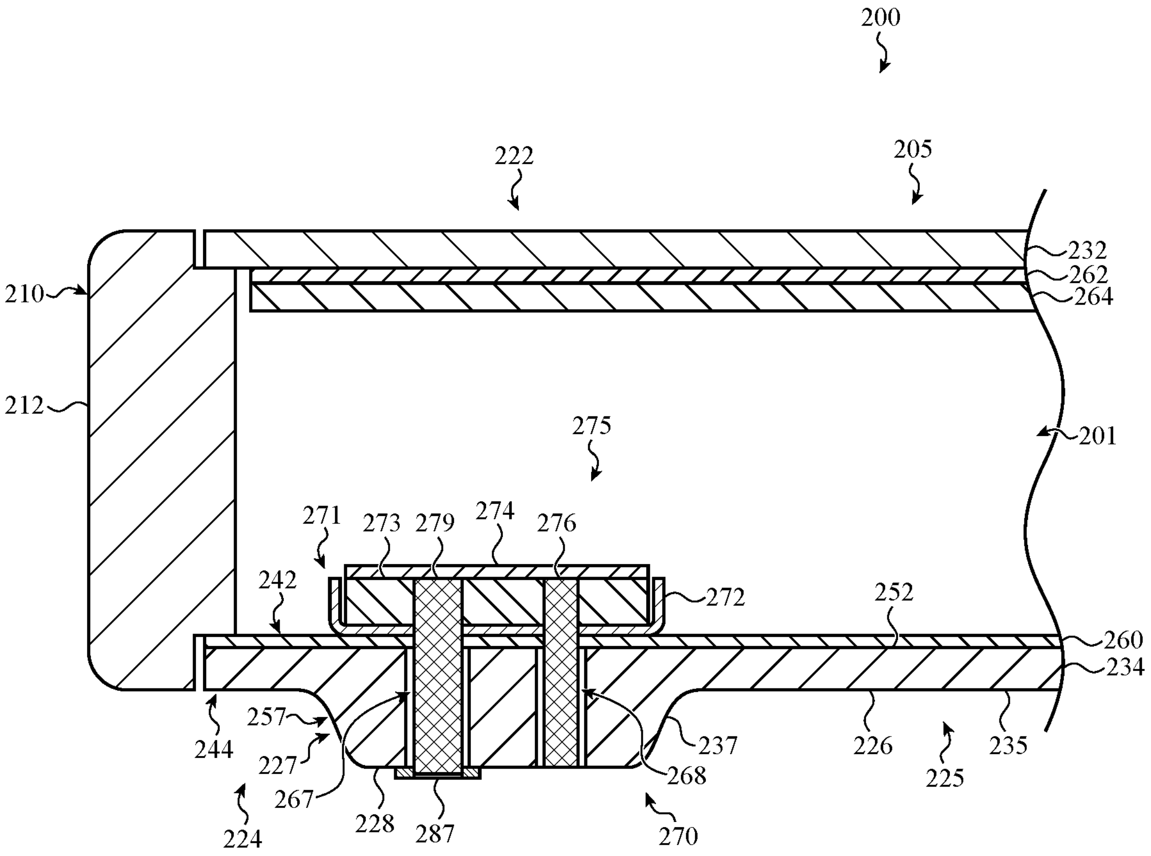
FIG. 2 shows a partial cross-section view of an electronic device.

In the example of FIG. 1B, the rear cover assembly 124 defines a thinner portion 125 and a thicker portion 127. As shown in FIG. 1B, the thicker portion 127 of the cover assembly 124 protrudes or is offset with respect to a thinner portion 125 of the cover assembly 124. The thicker portion 127 of FIG. 1B has a raised surface that defines a plateau, as described in more detail with respect to the raised surface 228 of FIG. 2. The description provided with respect to these features in FIG. 2 is generally applicable herein. In some examples, the thicker portion 127 is integrally formed with the thinner portion. In additional examples, the thinner portion 125 may be provided by the cover member 134 while the thicker portion 127 may be provided at least in part by an additional cover member which is coupled to the thinner portion.

The thicker portion 127 of the cover assembly 124 may accommodate one or more components of a sensing array 170. In the example of FIG. 1B, the sensing array 170 includes multiple optical components 179 and 176. In some cases, the optical components are part of multiple camera assemblies. Each of the camera assemblies may include an optical component such as the optical components 179 and 176. Each of the optical components 179 and 176 may be positioned at least partially within a respective opening in the thicker portion 127, as shown for the optical components 279 and 276 in FIG. 2. The optical component 179 may be a camera module while the optical component 176 may be an illumination module. The sensing array 170 may also include one or more additional components, such as the component 175. In some cases, the component 175 is part of a sensor assembly. The sensor assembly may measure a distance to a target, such as a Lidar sensor assembly which is configured to illuminate an object with light and then detect the reflected light to determine or estimate the distance between the electronic device and the object (e.g., a time of flight (TOF) sensor). In other examples, the sensor assembly may be a microphone.

As previously discussed, the rear cover assembly 124 includes a cover member 134 (also referred to herein as a rear cover member). In some embodiments, the cover member 134 is a composite cover member as described herein that includes metallic nanoparticles, non-metallic nanoparticles, or both. In other cases, the cover member 134 may lack the nanoparticles of the composite covers described herein and may be formed from a glass material, a polymer material, a ceramic material, or a combination thereof.

In some embodiments, the cover member 134 defines a thicker portion and a thinner portion that defines the thicker portion 127 and the thinner portion 125 of the cover assembly 124. In some cases, the thickness of the thicker portion of the cover member is greater than about 1 mm and less than or equal to about 2 mm or about 2.5 mm. The thickness of the thinner portion may be greater than about 0.3 mm and less than about 0.75 mm or greater than about 0.5 mm and less than about 1 mm.

The thicker portion of the cover member 134 may accommodate one or more components of a sensing array 170. The optical component 179 may be positioned at least partially within an opening in the thicker portion of the cover member 134, as shown for optical component 279 in FIG. 2.

The sensing array 170 may include one or more sensor assemblies, such as the sensor assembly 179. In some embodiments, the sensor assembly 179 may include one or more optical modules. For example, the sensor assembly may include an emitter module, a receiver module, or both. In some cases, the sensor assembly 179 may measure a distance to a target, such as a Lidar sensor assembly which is configured to illuminate an object with light and then detect the reflected light to determine or estimate the distance between the electronic device and the object (e.g., a time of flight (TOF) sensor). In some examples the sensor assembly 179 may be positioned below the cover member 134 (and the cover member 134 may act as a window for the sensor assembly 179). In these examples, the optical properties of the cover member 134 may be suitable for use over one or more optical components of the sensor assembly. For example, the one or more optical components may operate over one or more specified wavelength ranges and the cover member 134 may be configured to have a suitable transmission/transmittance over these wavelength ranges. In other examples, the cover member 134 may define an opening over the sensor assembly and an additional cover member may be placed in or over the opening (and act as a window for the sensor assembly).

Each of the front cover assembly 122 and the rear cover assembly 124 is coupled to the enclosure component 110. The enclosure component 110 may at least partially define a side surface of the electronic device 100 and may also be referred to herein as a housing or a housing assembly. An enclosure component used in combination with front and rear cover assemblies as shown in FIGS. 1A and 1B may also be referred to as a band. The enclosure component 110 may include one or more members. In the example of FIGS. 1A and 1B, the enclosure component 110 includes multiple members 112. The members 112 may be formed from a metal material (e.g., one or more metal segments), a glass material, a glass ceramic material, a ceramic material, or a combination of two or more of these materials. The enclosure component 110 also includes one or more dielectric members 114 (e.g., one or more dielectric segments). The dielectric members may be formed from a polymer material, a glass material, a glass ceramic material, a ceramic material, or a combination of two or more of these materials.

As a particular example, the enclosure component 110 may be formed from a series of metal segments (112) that are separated by dielectric segments (114) that provide some extent of electrical isolation between adjacent metal segments (e.g., by preventing electrical conduction through the dielectric segments). For example, a polymer segment (114) may be provided between a pair of adjacent metal segments (112). One or more of the metal segments may be coupled to internal circuitry of the electronic device 100 and may function as an antenna for sending and receiving wireless communication.

The example of FIGS. 1A and 1B is not limited, and in other examples the enclosure component 110 may have a different number of members or may be of unitary construction (e.g., a unibody). In additional examples, the front and rear cover assemblies may at least partially define a side surface of the electronic device. As referred to herein, an enclosure component or member formed from a particular material, such as a metal material, may also include a relatively thin coating of a different material along one or more surfaces, such as an anodization layer, a physical vapor deposited coating, a paint coating, a primer coating (which may include a coupling agent), or the like.

The enclosure component 110 may define one or more openings or ports. In the example of FIGS. 1A and 1B, the enclosure component 110 defines the openings 116 and 117. The opening 116 may allow (audio) input or output from a device component such as a microphone or speaker. The opening 117 may contain an electrical port or connection. In addition, the electronic device 100 may include one or more input devices. In the example of FIGS. 1A and 1B, the input devices 152, 156, and 158 have the form of a button and may extend through additional openings in the enclosure component 110. The input device 154 has the form of a switch. In some cases, the electronic device 100 also includes a support plate and/or other internal structural components that are used to support internal electronic circuitry or electronic components.

In some cases, the enclosure component 110 may include one or more members 115 positioned within a metal member (e.g., 112). In some cases, the member 115 may provide a window for an internal electronic component, may define a portion of a waveguide, and/or allow for beam-forming or beam-directing functionality. For example, the member 115 may define an antenna window for transmitting and receiving wireless signals. The member 115 may be configured to transmit wireless signals at one or more of the frequencies discussed with respect to FIG. 3. For example, the member 115 may be configured to transmit wireless signals at a frequency band between about 25 GHz and about 45 GHz.

The electronic device 100 includes a display 142. The front cover assembly 122 is positioned over the display 142. As previously discussed, the front cover assembly 122 may be substantially transparent or include one or more substantially transparent portions over the display and/or an optical component configured to operate over a visible wavelength range. The enclosure 105 may at least partially surround the display 142 and may enclose the display 142. The display 142 may produce graphical output which is transmitted through a substantially transparent portion of the front cover assembly. In some cases, the display 142 is a touch sensitive display. The display 142 may be a liquid-crystal display (LCD), a light-emitting diode (LED) display, an LED-backlit LCD display, an organic light-emitting diode (OLED) display, an active layer organic light-emitting diode (AMOLED) display, and the like. In some embodiments, the display 142 may be attached to (or may abut) the front cover assembly 122.

The electronic device 100 further includes multiple sensing arrays. As referred to herein, a sensing array may include one or more camera assemblies (e.g., a camera array), one or more sensor assemblies (e.g., a sensor array), an illumination assembly, or combinations of these. In some examples, the front sensing array 118 includes a front-facing camera assembly and a front-facing sensor assembly. The front sensing array may also include another sensor assembly, which in some cases may be an ambient light sensor. In the example of FIGS. 1A and 1B, the rear sensing array 170 includes an array of rear-facing camera assemblies and at least one sensor assembly as described in more detail below.

A sensor assembly may also be referred to herein simply as a sensor. Examples of sensor (assemblies) include, but are not limited to, a proximity sensor, a light sensor (e.g., an ambient light sensor), a biometric sensor (e.g., a face or fingerprint recognition sensor or a health monitoring sensor), a depth sensor, or an imaging sensor. Other examples of sensors include a microphone or a similar type of audio sensing device, a radio-frequency identification chip, a touch sensor, a force sensor, an accelerometer, a gyroscope, a magnetometer such as a Hall-effect sensor or other magnetic sensor, or similar types of position/orientation sensing devices. When the sensor is an optical sensor, the sensor may operate over a particular wavelength range such as a visible, an infrared, or an ultraviolet wavelength range. In some cases, the optical sensor is a reflectance sensor. The electronic device may further include a processing unit (also, processor) that computes a value based on a signal from the sensor.

An array of camera assemblies (also referred to herein as a camera array) typically includes multiple camera modules and one or more illumination modules. When the camera array includes multiple camera modules, each of the camera modules may have a different field of view or other optical property. For example, a camera module may be configured to produce an image from visible light or infrared light. The multiple camera modules may be also referred to as a set of camera modules and in some cases may form an array of camera modules. In some cases, a camera module includes an optical sensor array and/or an optical component such as a lens, filter, or window. In additional cases, a camera module includes an optical sensor array, an optical component, and a camera module housing surrounding the optical sensor array and the optical components. The camera module may also include a focusing assembly. For example, a focusing assembly may include an actuator for moving a lens of the camera module. In some cases, the optical sensor array may be a complementary metal-oxide semiconductor (CMOS) array or the like. The illumination module may be part of an illumination assembly that includes a light source such as a flood light source or other emitter which enables various sensing modes like face recognition and digital photography. For example, one or more emitters may emit an array of beams that are reflected off various parts of the face. The reflected beams can be used to create a point or depth map of the face and used to authenticate a user.

Optical modules included in the sensing array may include a photodetector and/or image sensor, associated electronics, one or more optical lenses, optical covers, barrels, or shrouds and associated optical elements. For example, the optical module may be a camera module, an illumination module, or a sensor module. The sensing array may define any number of optical modules such as one, two, three, four, five, or six optical modules.

In addition, the electronic device 100 may include one or more device components that may be part of a wireless communication system. As examples, the wireless communication system may be an RF or an IR communication system. In some cases, the device components are wireless transmission modules that may include one or more antenna assemblies, also referred to herein simply as antennas. An RF communication system may operate at one or more of a "low band" (e.g., less than 1 GHz, such as about 400 MHz to less than 1 GHz, about 600 MHz to about 900 MHz, or 600 MHz to 700 MHz), a "mid-band" frequency range (e.g., about 1 GHz to about 6 GHz, such as about 1 GHz to about 2.6 GHz, about 2 GHz to about 2.6 GHz, about 2.5 GHz to about 3.5 GHz, or about 3.5 GHz to about 6 GHz), or a "high-band" frequency range (e.g., about 24 GHz to about 40 GHz, about 57 GHz to about 64 GHz, or about 64 GHz to about 71 GHz), or a frequency range from about 1 GHz to about 10 GHz. As previously discussed, a component of an RF communication system may include an RF antenna configured to radiate a radio-frequency (RF) signal. The RF antenna may be configured to operate at one or more desired RF frequency ranges or RF frequency bands.

In some cases, the electronic device 100 may include one or more groups of antennas that include elements that are configured to communicate via a 5G wireless protocol (including millimeter wave and/or 6 GHz communication signals). 5G communications may be achieved using various different communications protocols. For example, 5G communications may use a communications protocol that uses a frequency band below 6 GHz (also referred to as the sub-6 GHz spectrum). As another example, 5G communications may use a communications protocol that uses a frequency band above 24 GHz (also referred to as the millimeter-wave spectrum). Further the particular frequency band of any given 5G implementation may differ from others. For example, different wireless communications providers may use different frequency bands in the millimeter-wave spectrum (e.g., one provider may implement a 5G communications network using frequencies around 28 GHz, while another may use frequencies around 39 GHz). The antenna group(s) may be configured to allow communications via one or multiple of the frequency bands that implement 5G communications. Alternately or additionally, the electronic device may include one or more antennas that operate in a 3G frequency band, a 4G frequency band, a GPS frequency band (such as an L1, L2, or a L5 frequency band), a WIFI frequency band, or the like.

In some cases, the electronic device 100 includes one or more directional antennas (or high gain antennas). Accordingly, the antenna gains of the directional antennas may be highest along particular directions. A directional antenna may include an array of transceiver elements that are used to form the shapes and orientations of the radiation patterns (or lobes) of the antenna, which may be a millimeter wave antenna. The electronic device 100 may include multiple directional antennas which have different primary transmission directions, as explained further with respect to FIG. 3.

FIG. 2 shows a partial cross-section view of an electronic device. The electronic device 200 includes an enclosure 205 which comprises a front cover assembly 222 and a rear cover assembly 224. One or both of the front cover assembly 222 or the rear cover assembly 224 may include a composite cover member as described herein. FIG. 2 may be an example cross-sectional view along A-A of FIG. 1B and the front cover assembly 222 and the rear cover assembly 224 and their respective elements may be as previously described with respect to FIGS. 1A and 1B.

The electronic device 200 includes a sensing array 270 located at the rear of the electronic device 200. The sensing array 270, which may also be described as a rear-facing sensing array, includes rear-facing optical modules 276 and 279. In the example of FIG. 2, the rear-facing optical modules 276 and 279 are part of a rear-facing camera array 275. For example, the optical module 276 may be an illumination module and the optical module 279 may be a camera module. The optical module 279 may be configured to operate over a visible wavelength range. At least some elements of the camera array 275 are positioned within the internal cavity 201 of the electronic device. The electronic device 200 may also include a component of a wireless communication and/or charging system, as previously described with respect to FIGS. 1A and 1B and illustrated in FIG. 3.

The front cover assembly 222 includes a cover member 232, a display 264, and a touch sensor 262. The electronic device also includes an enclosure component 210 which defines a side surface of the electronic device. The enclosure component may include a member 212.

The rear cover assembly 224 includes a cover member 234, which may be a composite cover member as described herein that includes metallic nanoparticles, non-metallic nanoparticles, or both. The composite cover member may be configured to absorb a wavelength of light in the visible spectrum that enters the composite cover. For example, the metallic nanoparticles, the non-metallic nanoparticles, or both may be configured to absorb a wavelength of light in the visible spectrum. Therefore, the composite cover member may have a characteristic hue (alternately, a chromatic color) due at least in part to this absorption of light. The perceived color of the composite cover member may be due at least in part to light reflected or otherwise directed back out of the composite cover member by the metallic and/or non-metallic nanoparticles and by reflection at interface between the composite cover member 234 and the internal coating 260. The interaction of light with the internal coating 260 is described in more detail below.

A composite cover member such as the cover member 234 may have a specified transmission value over a visible wavelength range. For example, a composite rear cover member may have a transmission ranging from 35% to 95%, from 35% to 90%, from 60% to 95%, or from 65% to 90% over a visible light range (e.g., 360 nm to 740 nm). In some cases, the average transmission is measured for a thickness of 2.4 mm.

The color of an enclosure component such as the cover member 234 may be characterized in several ways. For example, the color of the enclosure component may be characterized by coordinates in CIEL*a*b* (CIELAB) color space. In CIEL*a*b* (CIELAB) color space, L* represents brightness, a* the position between red/magenta and green, and b* the position between yellow and blue. Alternately or additionally, the color of a cover assembly may be characterized by coordinates in L*C*h* color space, where C* represents the chroma and h a b represents the hue angle (in degrees). The chroma C* is related to a* and b* as $C^*=\sqrt{(a^*)^2+(b^*)^2}$. In addition, the hue angle $h_{ab}$ is related to a* and b* as $h_{ab}=\tan^{-1}b^*/a^*$. A broadband or semi-broadband illuminant may be used to determine the color of a portion of the cover member or cover assembly. For example, a CIE illuminant or other reference illuminant may be used. In some cases, the color of the cover member may be determined from light transmitted through the cover member. In additional cases, the color of a cover member may be determined from light reflected back through the cover member (e.g., using a white background). The color of a combination of a colored cover member with an interior coating can also be characterized (e.g., determined from light reflected back through the cover member). The CIELAB or L*C*h coordinates for a given illuminant can be measured with a device such as a colorimeter or a spectrophotometer or calculated from transmission or reflectance spectra.

In some examples, a color of a cover member such as the rear cover member 234 is characterized by an a* value having a magnitude greater than or equal to 0.25, greater than or equal to 0.5, greater than or equal to 0.75, or greater than or equal to 1. In additional examples, the color of the rear cover member 234 is characterized by a b* value having a magnitude greater than or equal to 1, greater than or equal to 1.5, or greater than or equal to 2. In further examples, the color of the rear cover member such as the rear cover member 234 may have an L* value of at least 20, at least 80, at least 85, or at least 90. In addition, the color of the rear cover member 234 may be characterized by having a C* value greater than 1.75, greater than 2, or greater than 2.5. A chroma difference (ΔC*) between the two different portions of the rear cover member 234 may be at least 1, at least 2, at least 5, at least 10, at least 15, at least 20, at least 25, or ranging from 1 to 10, 5 to 20, or 15 to 50. In some cases, the color measurement may be made on a portion of the cover member 234 that at least partially defines the protrusion while in other cases the color measurement may be made on a portion of the cover member 234 that does not define the protrusion.

In the example of FIG. 2, the rear cover member 234 does not extend over the optical modules 276 and 279. Instead, the cover member 234 defines through-holes 267 and 268 and the optical modules 279 and 276 extend at least partially into these through-holes. A window 287 extends over the optical modules 279 and over the through-holes 267. The window 287 may be formed of a transparent glass ceramic, or a transparent ceramic such as sapphire, or glass. The rear cover member 234 may also extend over a component of a wireless communication and/or charging system, as previously described with respect to FIGS. 1A and 1B and illustrated in FIG. 3. The cover assembly 224 defines an interior surface 242 and an exterior surface 244.

In the example of FIG. 2, the cover assembly 224 includes a thicker portion 227 and a thinner portion 225 and the sensing array 270 is generally located in the vicinity of the thicker portion 227. The thicker portion 227 is at least partially defined by a thicker portion 237 of the cover member 234 and the thinner portion 225 is at least partially defined by a thinner portion 235 of the cover member 234. In some embodiments where the cover member 234 is a composite cover member, the optical properties of the thicker portion 237 of the cover member 234 vary from those of the thinner portion 235. For example, an average transmission over the visible range may be greater in the thinner portion 235 than in the thicker portion 237. In addition, a color of the thicker portion 237 may be different from that of the thinner portion 235

The thicker portion 227 also defines a feature 257 that protrudes with respect to the thinner portion 225. The feature 257 is also referred to generally herein as a protruding region, as a protruding feature, as a plateau region or feature, or as a bump. The thinner portion 225 of the cover assembly 224 defines an exterior surface 226 (also referred to herein as a base surface). The thicker portion 227 of the cover assembly 224 defines an exterior surface 228 (also referred to herein as a raised surface or top surface). As an example, the exterior surface 228 may substantially define a plateau. Such an exterior surface may also be referred to herein as a (raised) plateau surface. The feature 257 protrudes with respect to the exterior surface portion 226.

In the example of FIG. 2, the through-holes 267 and 268 extend through the thicker portion 227 of the cover assembly 224. The size of through-holes 267 and 268 is exaggerated for convenience of illustration. Openings to the holes are located in the exterior surface 228. The through-holes may be referred to as a set of through-holes and in some cases may define an array of through-holes. Similarly, the openings may be referred to as a set of openings and in some cases may define an array of openings. A module such as a camera module, a sensor module, or an illumination module may be positioned below or within each opening of the set of openings. In addition, at least some of the modules may extend into respective through-holes of the set of through-holes. An end of one or more of the modules may project beyond the exterior surface 228.

The camera array 275 further includes a support structure 271. The support structure 271 may be configured to hold various elements of the camera array 275 in place. For example, each of the optical modules 276 and 276 may be mounted to the support structure 271. In the example of FIG. 2, the support structure 271 includes a bracket 272 that is coupled to an interior surface of the cover assembly 224. In the example of FIG. 2, the support structure 271 also includes a frame 273 which nests at least partially within the bracket 272 and supports a circuit assembly 274, which may be mounted on a printed circuit board. However, this example is not limiting and in additional embodiments the support structure may have a different form.

As shown in FIG. 2, an internal coating 260 is disposed along an interior surface 252 of the cover member 234. In some embodiments, an external coating, such as a smudge resistant coating, may be disposed along an exterior surface of the cover member 234 as previously described with respect to FIG. 1B. The optical properties of the coating 260 may influence the optical properties of the rear cover assembly. For example, the coating may affect the amount of light transmitted back through the cover member to a viewer and thus may be termed an optical coating. In some embodiments, the coating 260 is configured to at least partially reflect light in the visible spectrum transmitted through the rear cover member and incident on the coating. In other words, the coating 260 is at least partially reflective. Reflection of visible light from the coating sends the reflected light back through the cover member. The reflected light exiting the cover member (and the cover assembly) contributes to the perceived color of the cover assembly.

The coating need not be mirror-like in order for its optical properties to influence the optical properties of the cover assembly. As one example, a partially reflective coating may simply be white or light in color. In addition, the coating 260 may adsorb at least some wavelengths of light transmitted through the rear cover member 234 and incident on the coating and thus may influence the spectrum or light reflected back through the rear cover member 234. In some cases, the spectrum of light reflected from the coating is similar to that incident on the coating (e.g., for a neutral coating having a* and b* near zero). In additional cases, the coating selectively absorbs some of the incident light, so that the color of the rear cover assembly 224 may differ from that of the rear cover member 234 (without the coating). For example, the perceived color of the rear cover assembly 224 may differ in chroma and/or hue from the color of the rear cover member 234.

The coating 260 may include a color layer, a multilayer interference stack, or both. When the coating includes both a color layer and a multilayer interference stack, the perceived color of the rear cover assembly 224 may be different in regions where the multilayer interference stack is present than in regions free of the multilayer interference stack. A color layer may be polymer based and include a colorant (e.g., a pigment or dye). As used herein, a color layer may have a distinct hue or may be near neutral in color (e.g., with a* and b* near zero, e.g., white). The coating 260 may include multiple polymer-based layers, at least one of which is a color layer. The coating 260 may include an optically dense layer, which may be placed behind a color layer or a multilayer interference stack. In some cases, the coating as a whole may be optically dense.

When the coating 260 includes a multilayer interference stack, the multilayer interference stack may be used to define a decorative logo or other symbol. The multilayer interference stack may include multiple dielectric layers, the multiple layers configured to produce optical interference. The multilayer interference stack may also be referred to herein as an optical interference stack or an optical interference coating (or coating element). For example, the multilayer interference stack may include a first layer comprising a first inorganic dielectric material and a second layer comprising a second inorganic dielectric material. For example, the coating may comprise a metal oxide, a metal nitride, and/or a metal oxynitride. Suitable metal oxides include, but are not limited to, a silicon oxide (e.g., $SiO_2$), niobium oxide (e.g., $Nb_2O_5$), titanium oxide (e.g., $TiO_2$), tantalum oxide (e.g., $Ta_2O_5$), zirconium oxide (e.g., $ZrO_2$), magnesium oxide (e.g., MgO), and the like. Suitable metal nitrides include, but are not limited to, silicon nitride ($SiN_x$), silicon oxynitride (e.g., $SiO_xN_y$) and the like. The layers of the first and second inorganic dielectric materials may be thin and may be deposited using physical vapor deposition or a similar technique. The description of the coating 260 is generally applicable herein and not limited solely to the example of FIG. 2.

The cover member 234 may be positioned over one or more internal components of the electronic device 200 and may also be configured to allow transmission of electromagnetic signals to and/or from the internal component. As an example, one or more regions of a composite cover member 234 may be configured to be RF-transmissive and may have a dielectric constant suitable for use over a radio-frequency antenna or wireless charging system. In some cases, the material or combination of materials of the cover member 234 may have a dielectric constant (also referred to as the relative permittivity) having a value from 3 to 7, 4 to 8, 4 to 6.5, 5 to 7, 5 to 6.5, 5.5 to 7.5, 5.5 to 7, or 6 to 7 in a radio frequency band. In some cases, these values are maximum values while in other cases these values are measured at the frequency range(s) of interest. As an example, the frequency range of interest may be from about 5 GHz to about 45 GHz, or from 25 GHz to 45 GHz. These values may be measured at room temperature. As a further example, the composite material of the cover member 234 may have a magnetic permeability sufficiently low that it does not interfere with transmission of magnetic fields generated by the inductive coupling wireless charging system. In some cases, the cover member 234 may be substantially non-magnetic.

Figure 3:
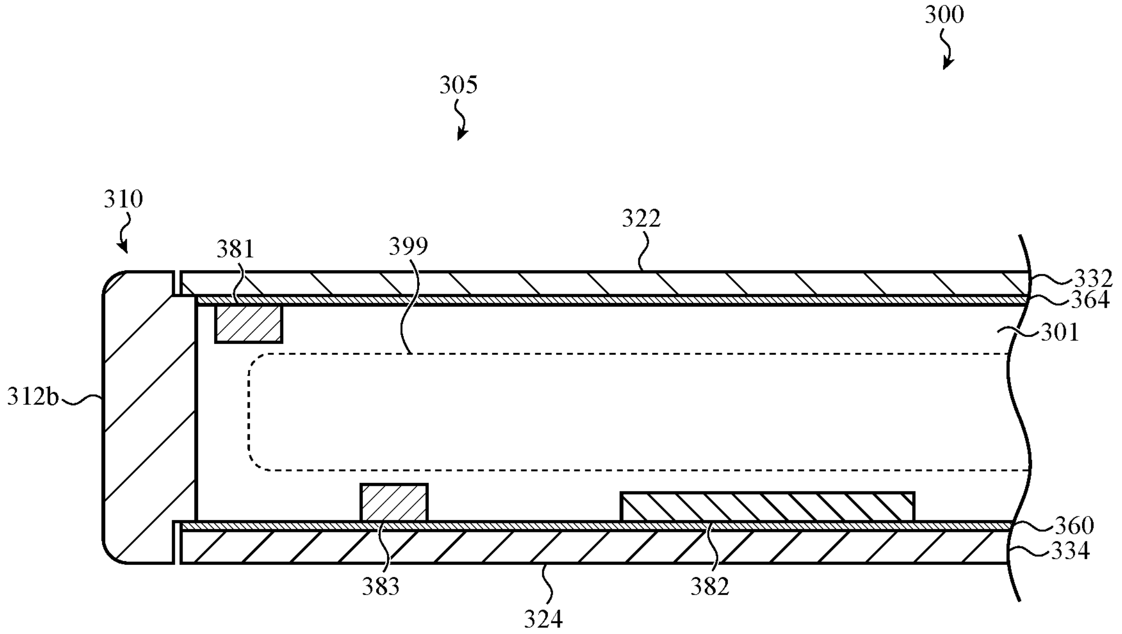
FIG. 3 shows another partial cross-section view of an electronic device.

FIG. 3 shows another partial cross-section view of an electronic device. As shown in FIG. 3, the electronic device 300 includes internal device components 381, 382, and 383 positioned within an internal cavity 301. As an example, the device components 381 and 383 may be part of a wireless communication system and the device component 382 may be part of a wireless charging system. In some cases, the electronic device 300 may include an additional device component that is part of the wireless communication system (not shown in this cross-section), which may be similar to components described with respect to FIGS. 1A and 1B. Additional device components 399 are indicated schematically with a dashed line and may include one or more of the components described with respect to FIG. 11. FIG. 3 may be an example of a partial cross-sectional view along B-B of FIG. 1B.

The enclosure 305 of the electronic device 300 includes a cover assembly 322 comprising a cover member 332. The cover member 332 extends over the internal device component 381 and may be a front cover member. The electronic device also includes a display 364, which may include a touch sensing layer. The enclosure 305 also includes a cover assembly 324 comprising a cover member 334. The cover member 334 extends over the internal device components 382 and 383 and may be a rear cover member. An internal coating 360 is coupled to an interior surface of the cover member 334. The cover assembly 322 and the cover assembly 324 are coupled to a member 312*b* of an enclosure component 310. The coating 360 may be similar in composition and optical properties to the coating 260 and for brevity that description is not repeated here.

The device component 383 may be part of a wireless communication system and in some cases may be a directional antenna (assembly). By the way of example, the device component 383 may have a primary transmission direction which is substantially perpendicular to the rear surface of the electronic device. The cover member 334 may therefore be configured to provide electrical properties suitable for use over the component of a wireless communication system. For example, the cover member 334 may be a dielectric cover member and may be formed from a material having a dielectric constant and a dissipation factor sufficiently low to allow transmission of RF or IR (e.g., near-IR) signals through the cover member. The cover member 334 may have similar dielectric properties to the cover member 234 and the cover member 134 and for brevity that description not repeated here. The device component 381, as well as the device component 383 may be similar to the device components described with respect to FIGS. 1A and 1B and may be operated at similar frequency ranges. For example, the device components 381 and 383 may be compatible with a 5G wireless protocol (including millimeter wave and/or 6 GHz communication signals). In some cases, the device components 381 and 383 may be configured to transmit wireless signals at a frequency band between about 25 GHz and 45 GHz. As shown in FIG. 3, the device component 383 may be located away from a periphery of the cover member 334, such as in a central region of the cover member.

When the device component 382 is part of an inductive coupling wireless charging system, the cover member 334 may also be configured to have a magnetic permeability sufficiently low that it does not interfere with transmission of magnetic fields generated by the inductive coupling wireless charging system. For example, the component of an inductive coupling wireless charging system may include a wireless receiver component such as a wireless receiver coil or other feature of the wireless charging system. As shown in FIG. 3, the device component 382 may be located away from a periphery of the cover member 334, such as in a central region of the cover member.

The device component 381 may also be part of a wireless communication system and in some cases may be a directional antenna (assembly). By the way of example, the device component 381 may have a primary transmission direction which is substantially perpendicular to the front surface of the electronic device. The cover member 332 may therefore be configured to provide electrical properties suitable for use over the component of a wireless communication system and may have electrical properties similar to those described with respect to the cover member 334 and may have optical properties similar to those previously described with respect to the cover member 132 of FIG. 1A.

Figure 4A:
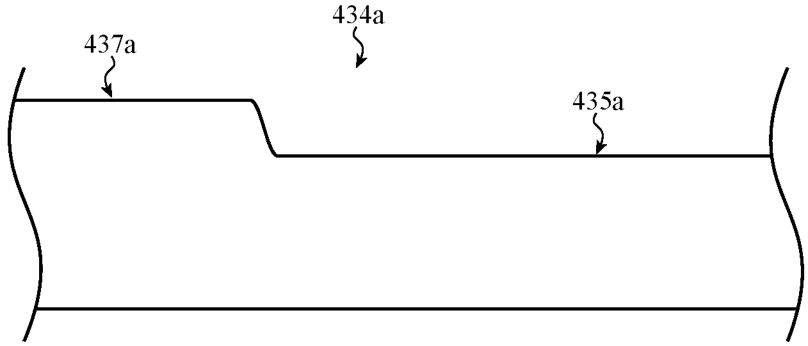
FIG. 4A shows a partial cross-section view of an enclosure component of an electronic device.

FIG. 4A shows a partial cross-section view of an enclosure component for an electronic device. In the example of FIG. 4A, the enclosure component 434*a*, which may be a composite enclosure component including nanoparticles, includes a thinner portion 435*a* and a thicker portion 437*a*. The enclosure component 434*a* of FIG. 4A may be an example of the rear cover member 134 of FIG. 1B, with the thicker portion 437*a* defining the protrusion 127. The thicker portion 437*a* may be positioned over a camera assembly as previously discussed with respect to the rear cover member 134 of FIG. 1B.

Figure 4B:
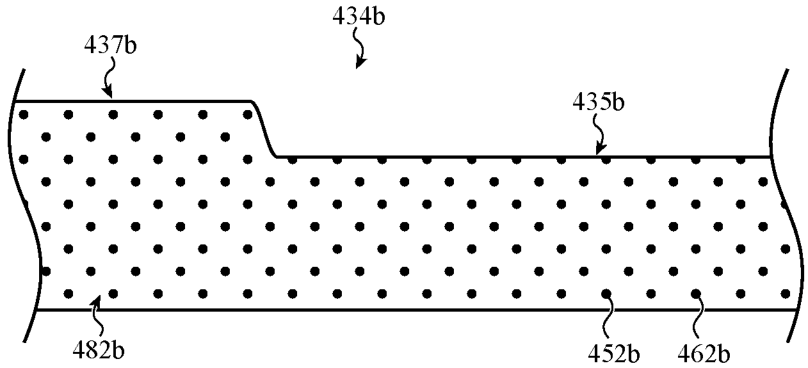
FIG. 4B shows another partial cross-section view of an enclosure component of an electronic device.

As previously described with respect to FIGS. 1A and 1B, all or part of the enclosure component 434*a* may include a composite material, so that the enclosure component 434*a* may be a composite enclosure component. The composite material may have a matrix of a glass-based material and one or more nanophases distributed in the matrix. The one or more nanophases, each of which may be in the form of nanoparticles, may provide one or more of a color or a mechanical property to the enclosure component. In embodiments, all or part of the enclosure component 434*a* may include a composite material having a matrix of a glass-based material and one or more sets of nanoparticles embedded in the matrix. The description of glass-based materials, nanophases, and nanoparticles provided with respect to FIG. 4B is generally applicable herein and is not repeated here.

In some embodiments, the one or more nanophases are dispersed throughout the composite enclosure component. For example, the one or more sets of nanoparticles may be dispersed so that a concentration of the nanoparticles within the matrix is substantially uniform, as schematically illustrated in FIG. 4B. As a result, the color and/or the toughness of the composite enclosure component may be substantially uniform throughout the composite enclosure component. In other examples, one or more of the sets of nanoparticles may be dispersed non-uniformly within the matrix, as schematically illustrated in FIGS. 9A-9C, 9E, and 10. In these examples, some regions of the composite enclosure component may have a color and/or a toughness than is different from other regions.

Figure 7A:
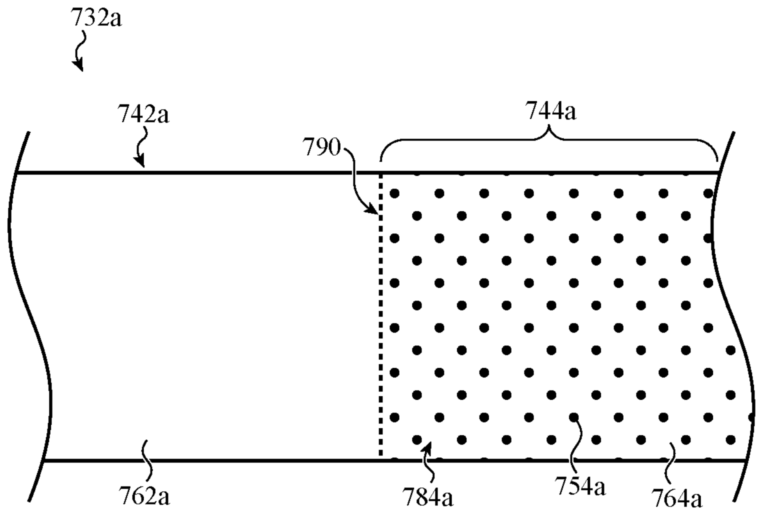
FIG. 7A shows a partial cross-section view of an enclosure component.
Figure 7B:
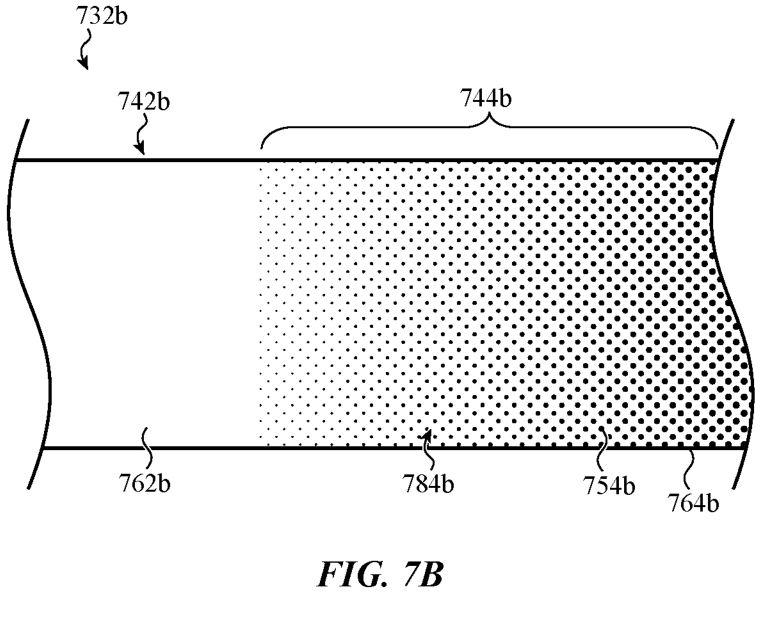
FIG. 7B shows another partial cross-section view of an enclosure component.

In some embodiments, one or more regions of the composite enclosure component are substantially free of one or more of the nanophases. For example, a region may be substantially free of nanoparticles when the concentration and/or the size of the nanoparticles is small enough that the presence of the nanoparticles in the region does not produce an appreciably affect an optical and/or mechanical property of the region of the composite enclosure component. For example, the presence of the nanoparticles in the region may affect the optical and/or mechanical property by less than or equal to 2%. In some examples, regions of the composite enclosure component positioned over the display may be substantially free of one or more nanoparticles that impart color to the composite enclosure component. FIGS. 7A, 7B, and 9D schematically illustrate examples of composite enclosure components that include a region that is substantially free of the nanoparticles present in another region.

In some instances, the glass-based material is a silicate-based glass, such as an aluminosilicate glass or a boroaluminosilicate glass. As used herein, an aluminosilicate glass includes the elements aluminum, silicon, and oxygen, but may further include other elements. Similarly, a boroaluminosilicate glass includes the elements boron, aluminum, silicon, and oxygen, but may further include other elements. For example, an aluminosilicate glass or a boroaluminosilicate glass may further include monovalent or divalent ions which compensate charges due to replacement of silicon ions by aluminum ions. Suitable monovalent ions include, but are not limited to, alkali metal ions such as $Li^+$, $Na^+$, or $K^+$, such as in alkali aluminosilicate glass. Suitable divalent ions include alkaline earth ions such as $Ca^{2+}$ or $Mg^{2+}$, such as in an alkaline earth aluminosilicate glass. In embodiments, the colored glass material is ion exchangeable. In additional examples, the aluminosilicate glass or a boroaluminosilicate glass may further includes dopants for the reinforcing phase(s) to be formed in the composite component (such as metal ions). In some examples, the aluminosilicate glass or a boroaluminosilicate glass may further include elements which stabilize the dopants during the melting process to allow formation of the reinforcing phase during a later heat treatment phase. In some embodiments, the silicate glass may be substantially free of tungsten or molybdenum (e.g., formed from a composition that is substantially free of tungsten oxide and/or molybdenum oxide). In some embodiments, the silicate glass may be substantially free of a conventional ultraviolet (UV) light activated photosensitizing agent for nucleation of metallic nanoparticles.

In some embodiments, the glass-based material is a glass ceramic material or a combination of a glass material and a glass ceramic material. As referred to herein, a glass ceramic material comprises one or more crystalline phases (e.g., crystals) formed by crystallization of a (precursor) glass material. In some cases, the crystalline phases are in the form of ceramic nanoparticles. These crystalline phases can contribute to the favorable mechanical properties of the glass ceramic material. The glass ceramic may further comprise an amorphous (glass) phase and the crystals may be dispersed in the glass phase. In some examples, the amount of the crystalline phase(s) is greater than 10%, from 20% to 90%, from 30% to 90%, from 40% to 90%, from 50% to 90%, from 60% to 90%, from 70% to 90%, from 20% to 40%, from 20% to 60%, from 20% to 80%, from 30% to 60%, or from 30% to 80% of the glass ceramic by weight. In some cases, these values may correspond to an average amount or a local amount of crystalline phase(s) in the glass ceramic component. The residual glass phase may form the balance of the material. In some embodiments, the glass ceramic may be substantially free of tungsten or molybdenum (e.g., formed from a composition including less than 0.5 mol % of tungsten oxide and/or molybdenum oxide).

By the way of example, the glass ceramic material may be an alkaline silicate, an alkaline earth silicate, an aluminosilicate, a boroaluminosilicate, a perovskite-type glass ceramic, a silicophosphate, an iron silicate, a fluorosilicate, a phosphate, or a glass ceramic material from another glass ceramic composition system. In some embodiments, the glass ceramic material comprises an aluminosilicate glass ceramic or a boroaluminosilicate glass ceramic. Aluminosilicate glasses can form several types of crystalline phases, including β quartz solid solution crystals, keatite solid solution crystals (β spodumene solid solution crystals), petalite crystals, lithium disilicate crystals, and various other silicates. Other silicates include, but are not limited to, silicates including aluminum and optionally other elements such as lithium, sodium, potassium, and the like. Examples of such silicates include lithium orthoclase, lithium orthosilicate, (Li, Al, Na) orthosilicates (e.g., α or β eucryptite), and lithium metasilicate.

In addition to the principal elements of the glass ceramic material (e.g., aluminum, silicon, and oxygen for an aluminosilicate) the glass ceramic material may also include other elements. For example, the glass ceramic material (and the precursor glass) may include elements from nucleating agents for the glass ceramic material, such as a metal oxide (Ti, Zr) or other suitable oxide material. Aluminosilicate and boroaluminosilicate glass ceramics may further include monovalent or divalent ions similar to those described for aluminosilicate and boroaluminosilicate glasses. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. The glass ceramic material may be ion exchangeable. In additional examples, the glass ceramic may further include dopants for the reinforcing phase(s) to be formed in the composite component (such as metal ions).

In some cases, the glass-based material is chemically strengthened by ion exchange. For example, an ion-exchangeable glass or glass ceramic material may include monovalent or divalent ions such as alkali metal ions (e.g., $Li^+$, $Na^+$, or $K^+$) or alkaline earth ions (e.g., $Ca^{2+}$ or $Mg^{2+}$) that may be exchanged for other alkali metal or alkaline earth ions. If the glass or glass ceramic material comprises sodium ions, the sodium ions may be exchanged for potassium ions. Similarly, if the glass or glass ceramic material comprises lithium ions, the lithium ions may be exchanged for sodium ions and/or potassium ions. Exchange of smaller ions in the glass or glass ceramic material for larger ions can form a compressive stress layer along a surface of the glass or glass ceramic material. Formation of such a compressive stress layer can increase the hardness and impact resistance of the glass or glass ceramic material.

FIG. 4B shows another partial cross-section view of an enclosure component of an electronic device. The enclosure component 434*b* of FIG. 4B is a composite enclosure component that includes a composite material 482*b*. The composite material 482*b* includes nanoparticles 452*b* in a matrix of a glass-based material 462*b*. The nanoparticles 452*b* are schematically illustrated in FIG. 4B and have been enlarged for convenience of illustration. Furthermore, the shape of the nanoparticles 452*b* is not limited to the rounded (spherical) shape shown in FIG. 4B and the nanoparticles 452*b* may have any suitable shape consistent with their composition. The composite enclosure component 434*b* includes a thinner portion 435*b* and a thicker portion 437*b* and may be another example of the rear cover member 134 of FIG. 1B.

In some embodiments, the nanoparticles 452*b* are metallic nanoparticles. The metallic nanoparticles may be formed from one or more metals. In some cases, the metallic nanoparticles are formed of one or more transition metals such as titanium, chromium, vanadium, manganese, iron, cobalt, nickel, copper, silver, gold, and the like. The nanoparticles may have a size less than 1 micrometer, such as from 10 nm to less than 1 micrometer, from 15 nm to 200 nm, from 15 nm to 150 nm, from 15 nm to 100 nm, from 20 nm to 100 nm, from 50 nm to 150 nm, from 50 nm to 150 nm, or from 100 nm to 200 nm. For example, an average size or a median size of the metallic particles may fall within one of these size ranges. In some examples, metallic nanoparticles may have a generally rounded shape, such as a spherical shape, or an elongated shape, such as a prolate spheroid. In some examples, the metal of the metallic nanoparticles may be present in a concentration greater than or equal to 0.01 mol % and less than or equal to 0.5 mol %, 1 mol %, 2 mol %, 4 mol %, 6 mol %, 8 mol %, or 10 mol %. As specific examples, the metal of the metallic nanoparticles may be present at a concentration from 0.01 mol % to 2 mol %, from 0.5 mol % to 2 mol %, from greater than 5% to 10 mol % or from greater than 7 mol % to 10 mol %.

In embodiments, the metallic nanoparticles may help to impart a color to the composite enclosure component. For example, the metallic nanoparticles may absorb certain wavelengths of visible light via plasmon resonance absorption. In further embodiments, the metallic nanoparticles may help increase the toughness of the composite enclosure component as compared to a similar enclosure component which is free of the metallic nanoparticles. For example, when a concentration of the metallic nanoparticles is sufficiently high and/or the interparticle spacing of the metallic nanoparticles is sufficiently low, the presence of the metallic nanoparticles may help to arrest propagation of a crack through the composite component. As an additional example, when the metallic nanoparticles are more ductile than the glass-based matrix, the ductility of the metallic nanoparticles also help arrest propagation of a crack through the composite component. In some cases, the increased toughness may be indicated by a reduced hardness of the composite enclosure component as compared to a similar enclosure component that is free of the metallic nanoparticles.

In some embodiments, the nanoparticles 452*b* are non-metallic particles, such as semiconductor particles or ceramic particles. The non-metallic particles may have a size less than 1 micrometer, such as from 10 nm to less than 1 micrometer, from 10 nm to less than 100 nm, from 15 nm to 200 nm, from 15 nm to 150 nm, from 15 nm to 100 nm, from 20 nm to 100 nm, from 50 nm to 150 nm, from 50 nm to 200 nm, or from 100 nm to 200 nm. For example, an average or a median size of the non-metallic particles may fall within one of these size ranges.

Semiconductor nanoparticles may be nanoparticles of a compound semiconductor. In some examples, the compound semiconductor may be a metal oxide semiconductor, such as a zinc oxide (e.g., ZnO or $ZnO_2$), a titanium oxide (e.g., $TiO_2$), or a tin oxide (e.g., $SnO_2$). In some cases, zinc oxide, titanium oxide, and tin oxide semiconductors can primarily absorb UV light, rather than visible light. Therefore, nanoparticles formed from these materials can have limited absorption over the visible wavelength range and may not substantially change the color of the composite component. In some embodiments, the semiconductor nanoparticles are substantially free of tungsten or molybdenum. Compound semiconductors may alternately be classified by the periodic table groups of their elements, such as an II-VI semiconductor, a III-V semiconductor, an IV-VI semiconductor, or an IV compound semiconductor. For example, II-VI semiconductors include, but are not limited to ZnO, ZnS, ZnSe, ZnTe, CdS, and CdSe. In some cases, the semiconductor may be a ternary semiconductor rather than a binary semiconductor.

In some embodiments, the semiconductor nanoparticles may help impart a color to the composite enclosure component. For example, the semiconductor nanoparticles may absorb certain wavelengths of visible light (e.g., when the semiconductor has a band gap that lies in the visible region). In other embodiments, the semiconductor nanoparticles do not significantly absorb light in the visible spectrum and therefore the presence of the semiconductor nanoparticles in the glass does not significantly change the color of the glass. In some examples, the semiconductor nanoparticles have a size and a refractive index that does not produce undue scattering of visible light within the composite component. The semiconductor nanoparticles may modify a mechanical property of the glass. For example, when a concentration of the semiconductor nanoparticles is sufficiently high and/or an interparticle spacing of the semiconductor nanoparticles is sufficiently low, the presence of the semiconductor nanoparticles may help to arrest propagation of a crack through the composite component.

In the example of FIG. 4B, the concentration of the nanoparticles 452*b* is generally uniform through the thickness. Such a concentration profile may be obtained by forming the nanoparticles from a doped glass-based material that has a uniform composition through its thickness. For example, the nanoparticles may be formed using a heat treatment process that heats the whole component or a portion thereof for a sufficient time to allow substantially uniform formation of the nanoparticles. The concentration may be measured over a volume large enough to include a plurality of the nanoparticles.

Figure 4C:
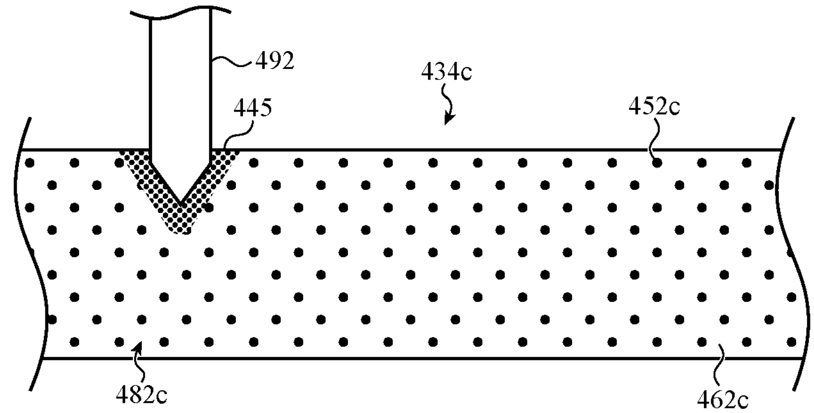
FIG. 4C schematically shows indentation testing of an enclosure component including nanoparticles.

FIG. 4C schematically shows indentation testing of a composite enclosure component. Indentation testing may be used to determine the hardness of the composite enclosure component. The enclosure component 434*c* of FIG. 4C is a composite enclosure component that includes a composite material 482*c*. The composite material 482*c* includes nanoparticles 452*c* in a matrix of a glass-based material 462*c*. The nanoparticles 452*c* are schematically illustrated in FIG. 4C and have been enlarged for convenience of illustration. The composite enclosure component 434*c* may be another example of the rear cover member 134 of FIG. 1B.

The hardness of the composite enclosure component 434*c*, such as the Vickers hardness, can be determined based on the applied load and the size of the indentation after the indenter 492 is removed. In some cases, the composite enclosure component 434*c* has a lower hardness as compared to a similar enclosure component that is free of the metallic nanoparticles. As schematically indicated in FIG. 4C, the penetration of the indenter 492 into the composite enclosure component 434*c* creates a deformation zone 445. In some cases, the penetration of the indenter 492 into the composite enclosure component 434*c* results in fewer and/or smaller cracks as compared to a similar enclosure component that is free of the metallic nanoparticles. Therefore, the composite enclosure component 434*c* may have a higher toughness as compared to a similar glass-based enclosure component that is free of the metallic nanoparticles. In some examples, toughness may be measured by an indentation fracture toughness test, such as a fracture toughness test using a Vickers or a Berkovich indenter. Alternately, the toughness may be measured with a chevron-notch or straight sharp notch three-point bending test.

Figure 4D:
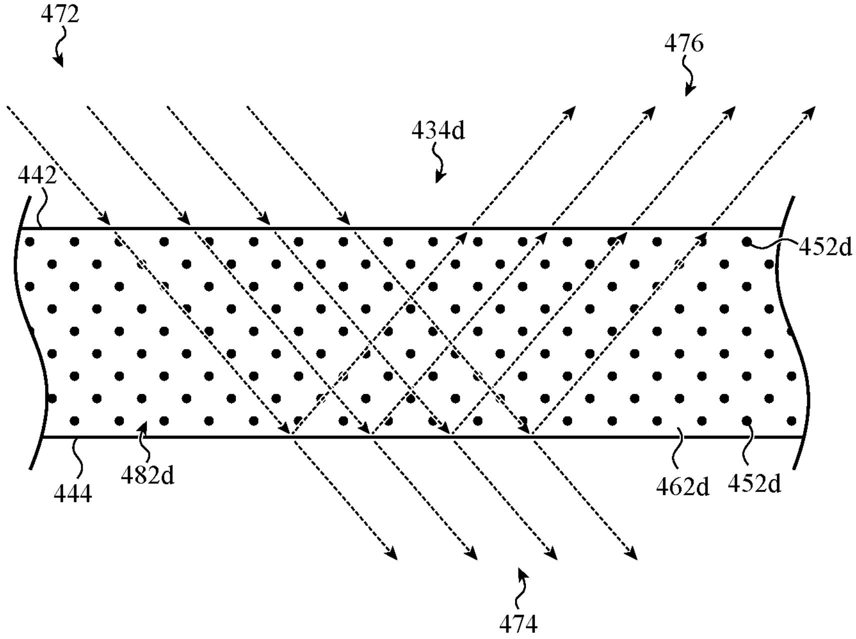
FIG. 4D schematically shows interaction of light with an enclosure component including nanoparticles.

FIG. 4D schematically shows interaction of light with a composite enclosure component including nanoparticles. The enclosure component 434*d* of FIG. 4D includes a composite material 482*d* that includes nanoparticles 452*d* in a matrix 462*d* of a glass-based material. The nanoparticles 452*d* are schematically illustrated in FIG. 4D and have been enlarged for convenience of illustration. In some cases, the nanoparticles 452*d* may be metallic nanoparticles. The composite enclosure component 434*d* of FIG. 4A may be an example of the rear cover member 134 of FIG. 1B and defines a front surface 442 and a rear surface 444.

As shown in FIG. 4D, light 472 is directed towards the composite enclosure component 434*d* and at least some of this light enters a front surface 442 of the composite enclosure component 434*d*. In some cases, the nanoparticles 452*d* within the composite enclosure component 434*d* interact with the light that enters and travels through the composite enclosure component 434*d* by absorbing at least one or more wavelengths of light. Therefore, the light 474 that is transmitted through the composite enclosure component 434*d* may have a different spectral profile than the light 472 that enters the composite enclosure component 434*d*. As shown in FIG. 4D, some of the light 474 is reflected from a rear surface 444 and travels back through the composite enclosure component 434*d* to exit the front surface 442. In some cases, the nanoparticles 452*d* may reflect or otherwise direct light towards the front surface 442. The light 476 exiting the front surface 442 may have a spectral profile that is different from that of the light 474 due to additional selective absorption of some wavelengths of light in the composite enclosure component 434*d*. In some cases, the spectral profile of the light 476 may determine the color of the composite enclosure component 434*d* as perceived by a viewer.

As previously shown and discussed with respect to FIGS. 2 and 3, in some embodiments a coating may be provided along at least a portion of an interior surface of the composite enclosure component. This coating may also absorb some wavelengths of the light 474. In cases when the coating selectively absorbs wavelengths of the light 474 and also reflects light back through the composite enclosure component 434*d* towards the front surface 442, the spectral profile and the intensity of the light 476 may be further affected by the absorption of the coating. In these embodiments, the absorption properties of both the coating and the nanoparticles can determine the color of the composite enclosure component as perceived by a viewer. In other words, the coating may be configured to produce a first reflected color (in the absence of the nanoparticles), the nanoparticles may be configured to produce a second reflected color (in the absence of the coating), and the perceived color reflected from the composite enclosure may be a third reflected color that is different than the first reflected color and the second reflected color. In other words, the peak(s) of the spectral profile of the light reflected from the composite enclosure may include contributions from light reflected from the nanoparticles and light reflected from the coating.

Figure 5A:
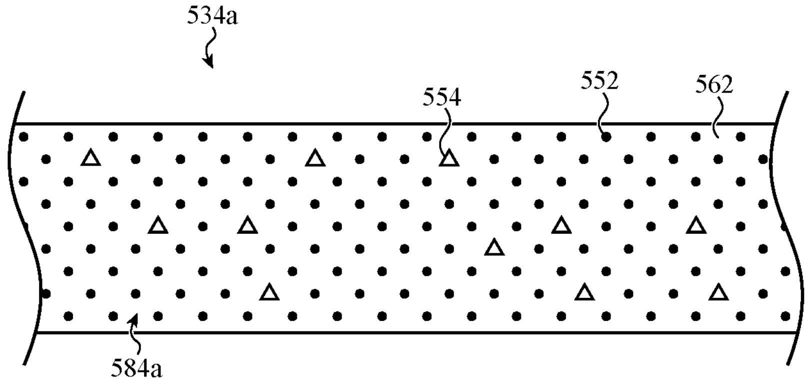
FIG. 5A schematically shows two different sets of nanoparticles within an enclosure component.

FIG. 5A shows a partial cross-section view of an enclosure component for an electronic device. The composite enclosure component 534*a* includes a composite material 584*a* that includes two different types of nanoparticles, 552 and 554. The first type of nanoparticles, 552, is shown with a circular cross-section and a second type of nanoparticle, 554, is shown with a triangular cross-section. Nanoparticles of the first type of nanoparticles are also referred to herein as first nanoparticles and nanoparticles of the second type are also referred to herein as second nanoparticles. The first type of nanoparticles 552 may differ from the second type of nanoparticles 554 in one or more of composition, shape, size, or combinations of these as described in more detail below.

The composite material 584*a* includes first nanoparticles 552 and a second nanoparticles 554 in a matrix of a glass-based material 562. The first nanoparticles 552 and the second nanoparticles 554 are schematically illustrated in FIG. 5A and have been enlarged for convenience of illustration. The shapes of the nanoparticles 552 and 554 were selected to distinguish the two sets of nanoparticles and the shapes of the nanoparticles 552 and 554 are not limited to those shown in FIG. 5A. In some embodiments, both sets of nanoparticles 552 and 554 may have similar shapes, such as a generally spherical shape. In other embodiments, the nanoparticles 554 may have a different shape from the nanoparticles 552.

The nanoparticles 552 and the nanoparticles 554 may differ in composition. In some cases, the nanoparticles 552 are metallic nanoparticles and the nanoparticles 554 are non-metallic nanoparticles ceramic or semiconductor nanoparticles. In other cases, the nanoparticles 552 and 554 are both metallic nanoparticles that differ in composition. In other cases, the nanoparticles 552 and 554 may be any of the nanoparticles previously described with respect to FIG. 4B. In some examples, one type of nanoparticle may affect the color of the composite enclosure component while another type of nanoparticle may have little effect on the color of the composite enclosure component. One or both types of nanoparticles may affect the mechanical properties of the composite enclosure component.

Figure 5B:
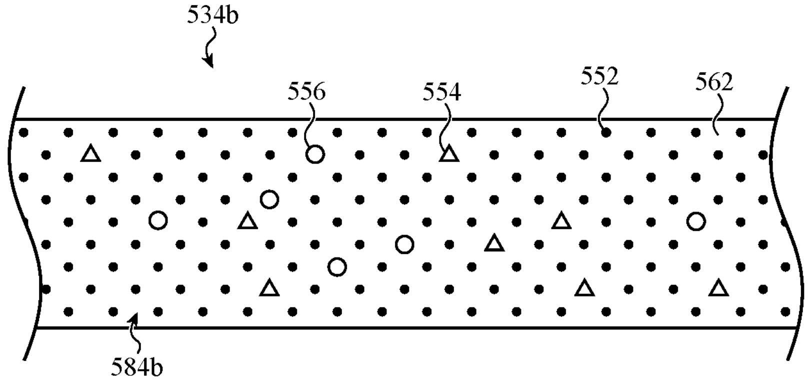
FIG. 5B schematically shows three different sets of nanoparticles within an enclosure component.

FIG. 5B is a partial cross-section view of an enclosure component for an electronic device. The composite enclosure component 534*b* includes a composite material 584*b* that includes three different types of nanoparticles, 552, 554, and 556. The first type of nanoparticle, 552, is shown with a circular cross-section, the second type of nanoparticle, 554, is shown with a triangular cross-section, and the third type of nanoparticle 556 is shown with a circular cross-section with an open center. Nanoparticles of the first type of nanoparticles are also referred to herein as first nanoparticles, nanoparticles of the second type are also referred to herein as second nanoparticles, and nanoparticles of the third type are also referred to herein as third nanoparticles. Each of the first type of nanoparticles 552, the second type of nanoparticles 554, and the third type of nanoparticles 556 may differ in one or more of composition, shape, size, or combinations of these. In some examples, one type of nanoparticle may affect the color of the composite enclosure component while another type of nanoparticle may have little effect on the color of the composite enclosure component. One or more types of nanoparticles may affect the mechanical properties of the composite enclosure component.

The composite material 584*b* includes a first set of nanoparticles 552, a second set of nanoparticles 554, and a third set of nanoparticles 556 in a matrix of a glass-based material 562. The nanoparticles 552, 554, and 556 are schematically illustrated in FIG. 5A and have been enlarged for convenience of illustration. The shapes of the nanoparticles 552, 554, and 546 were selected to distinguish the three sets of nanoparticles and are not limited to those shown in FIG. 5A. In some embodiments, the nanoparticles 552, 554, and 556 may have similar shapes, such as a generally spherical shape. In other embodiments, the nanoparticles 554 and/or the nanoparticles 556 may have a different shape from the nanoparticles 552.

In some embodiments, the nanoparticles 552, the nanoparticles 554, and the nanoparticles 556 differ in composition. In some examples, the nanoparticles 552 are metallic nanoparticles, the nanoparticles 554 may be ceramic or semiconductor nanoparticles, and the nanoparticles 556 may be metallic nanoparticles having a different composition than the nanoparticles 552. In other cases, the nanoparticles 552, 554, 556 may be any of the nanoparticles previously described with respect to FIG. 4B.

Figure 6:
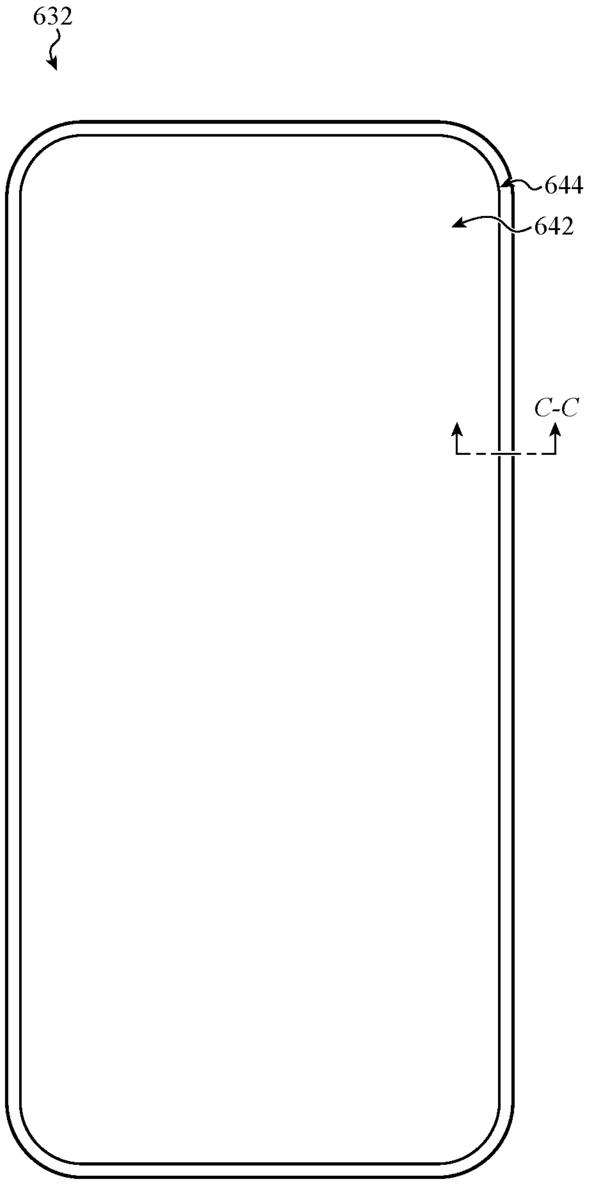
FIG. 6 shows an example enclosure component.

FIG. 6 shows an enclosure component of an electronic device. The enclosure component 632 of FIG. 6 may be an example of the front cover member 132 of FIG. 1A. The enclosure component 632 includes a peripheral region 644 and a region 642 interior to the peripheral region. The region 642 may be positioned over a display of the electronic device. In some cases, such as in the example of FIG. 6, the region 642 is a central region of the enclosure component.

As previously described with respect to FIGS. 1A and 1B, all or part of the enclosure component 632 may include a composite material, so that the enclosure component 632 may be a composite enclosure component. The composite material may have a matrix of a glass-based material and one or more nanophases distributed in the matrix. The one or more nanophases, each of which may be in the form of nanoparticles, may provide one or more of a color or a mechanical property to the composite enclosure component. In embodiments, all or part of the enclosure component 632 may include a composite material having a matrix of a glass-based material and one or more sets of nanoparticles embedded in the matrix. The description of glass-based materials, nanophases, and nanoparticles provided with respect to FIG. 4B is generally applicable herein and is not repeated here.

In some embodiments, the peripheral region 644 may have a different internal structure than the region 642 interior to the peripheral region 644. The internal structure of the region 642 may be suitable for use over a display. For example, the internal structure of the region 642 may be configured to produce a suitable level of light transmission and clarity with minimum haze. As an additional example, the region 642 may be configured so that it does not preferentially absorb wavelengths of visible light passing through the region 642, so that it does not substantially modify the color output of the display. As examples, the region 642 may be formed from a glass-based material or may be formed from a composite material that includes nanoparticles in a matrix of the glass-based material, wherein the nanoparticles have a size and composition suitable to produce the desired optical properties.

In some examples, the peripheral region 644 includes or is formed of a composite material that has an internal structure that includes at least one nanophase distributed in a matrix of a glass-based material and the region 642 has the internal structure of a glass-based material that lacks the nanophase of the peripheral region 644, as shown in FIGS. 7A, 7B, and 9D. As previously discussed, the at least one nanophase may be in the form of nanoparticles. In other examples, each of the peripheral region 644 and the region 642 include a composite material, but the composite materials are different, as shown in the examples of FIGS. 9A, 9B, 9C, and 9E. In some cases, the composite enclosure component may define a sharp transition between the internal structures of the different regions (642, 644), while in other regions the composite enclosure component may define a graded transition between the internal structures of the different regions. The peripheral region 644 may extend around the entire periphery of the composite enclosure component. In some cases, the peripheral region 644 may define one or more transmissive windows for an optical component such as one or more optical components of a front sensing array.

FIG. 7A shows a partial cross-section view of an enclosure component for an electronic device. The enclosure component 732*a* of FIG. 7A is a composite enclosure component that includes two regions, a first region 742*a* and a second region 744*a*. The vertical dashed line schematically indicates a boundary 790 between the first region 742*a* and the second region 744*a*. The composite enclosure component 732*a* may be an example of the enclosure component 632 of FIG. 6, with the cross-section taken along C-C, the first region 742*a* being located in the region 642, and the second region 744*a* being located in the region 644.

As shown in FIG. 7A, the first region 742*a* is formed of a glass-based material 762*a* and is free of the nanoparticles 754*a*. As previously discussed with respect to FIG. 6, the optical properties of the glass-based material 762*a* may be suitable for use over a display. The second region 744*a* is formed of a composite material 784*a* that includes nanoparticles 754*a* in a matrix of a glass-based material 764*a*. In some examples, the nanoparticles 754*a* may help increase the toughness of the material, such as by impeding or arresting crack propagation through the composite enclosure component 732*a*. In further examples the nanoparticles may produce or help to produce a desired color of the composite enclosure component as previously discussed with respect to FIG. 4D. In the example of FIG. 7A, only one type of nanoparticle 754*a* is present in the second region 744*a*. However, this example is not limiting and in additional examples, the second region may include one or more additional types of nanoparticles as was previously shown and described with respect to FIGS. 5A and 5B. The nanoparticles 754*a* are schematically illustrated in FIG. 7A and have been enlarged for convenience of illustration.

In the example of FIG. 7A, the concentration of the nanoparticles 754*a* in the second region 744*a* is substantially uniform and the transition between the first region 742*a* and the second region 744*b* is distinct. However, this example is not limiting and in further examples the composite enclosure component may define concentration gradient (e.g., in the second region 744*a*) that gradually decreases towards the first region, an example of which is shown in FIG. 7B. The slope of the concentration gradient may be linear or non-linear. For example, the concentration gradient may be determined by heat distribution produced by a localized heat source, such as laser. The concentration gradient may define a transition in one or more optical properties, mechanical properties, or both.

In some examples, the composite enclosure component 732*a* is formed from a workpiece that has a uniform composition prior to formation of the nanoparticles. This uniform composition may be the same as the composition of the glass-based material 762*a*. The nanoparticles 754*a* may then be selectively formed in the region 744*a* of the composite enclosure component 762*a*. Therefore, the overall composition of the first region 742*a* and the second region 744*a* may be about the same. The composition of the glass-based material 762*a* may differ from the composition of the glass-based material 764*a* due to loss of the elements used to form the nanoparticles. For example, when the nanoparticles 754*a* are metallic nanoparticles, the glass-based material 762*a* may include a greater amount of the metal(s) that make up the nanoparticles than the glass-based material 764*a*.

The nanoparticles 754*a* are schematically illustrated in FIG. 7A and have been enlarged for convenience of illustration. Furthermore, the shape of the nanoparticles 754*a* is not limited to the spherical shape shown in FIG. 7A and the nanoparticles 754*a* may have any suitable shape consistent with their composition. The nanoparticles 754*a* may be any of the nanoparticles previously described with respect to FIG. 4B, such as metallic nanoparticles, non-metallic nanoparticles, or a combination thereof.

FIG. 7B shows another partial cross-section view of an enclosure component for an electronic device. The enclosure component 732*b* of FIG. 7B is a composite enclosure component that includes two regions, a first region 742*b* and a second region 744*b*. The composite enclosure component 732*b* may be an example of the enclosure component 632 of FIG. 6, with the cross-section taken along C-C, the first region 742*b* being located in the region 642, and the second region 744*b* being located in the region 644.

As shown in FIG. 7B, the first region 742*b* is formed of a glass-based material 762*b* and is free of the nanoparticles 754*b*. As previously discussed with respect to FIG. 6, the optical properties of the glass-based material 762*b* may be suitable for use over a display. The second region 744*b* is formed of a composite material 784*b* that includes nanoparticles 754*b* in a matrix of a glass-based material 764*b*. As previously discussed with respect to FIG. 7A, the nanoparticles 754*a* may help increase the toughness of the material, may produce or help to produce a desired color of the composite enclosure component, or both. In the example of FIG. 7B, only one type of nanoparticle 754*a* is shown in the second region 744*b*. However, this example is not limiting and in additional examples, the second region may include one or more additional types of nanoparticles as was previously shown and described with respect to FIGS. 5A and 5B.

In contrast to the example of FIG. 7A, the nanoparticles 754*b* in the second region 744*b* define a concentration gradient that gradually decreases towards the first region. As shown in FIG. 7B, the gradient in the concentration of the nanoparticles 754*b* is achieved at least in part by a gradient in the size of the nanoparticles. For example, the size of the nanoparticles gradually decreases from right to left in FIG. 7B. The concentration gradient may make the difference between the two regions less noticeable as compared to the example of FIG. 7A.

The composite enclosure component 732*b* may be formed from a workpiece that has a uniform composition prior to formation of the nanoparticles in a similar fashion as previously described with respect to FIG. 7A, except that the process for forming the nanoparticles is adjusted to produce the desired concentration gradient. In some examples, the concentration gradient extends across the entire second region 744*b* while in other examples the concentration gradient extends across less than the entire second region 744*b*.

The nanoparticles 754*b* are schematically illustrated in FIG. 7B and have been enlarged for convenience of illustration. Furthermore, the shape of the nanoparticles 754*b* is not limited to the spherical shape shown in FIG. 7B and the nanoparticles 754*b* may have any suitable shape consistent with their composition. The nanoparticles 754*b* may be any of the nanoparticles previously described with respect to FIG. 4B.

Figure 8:
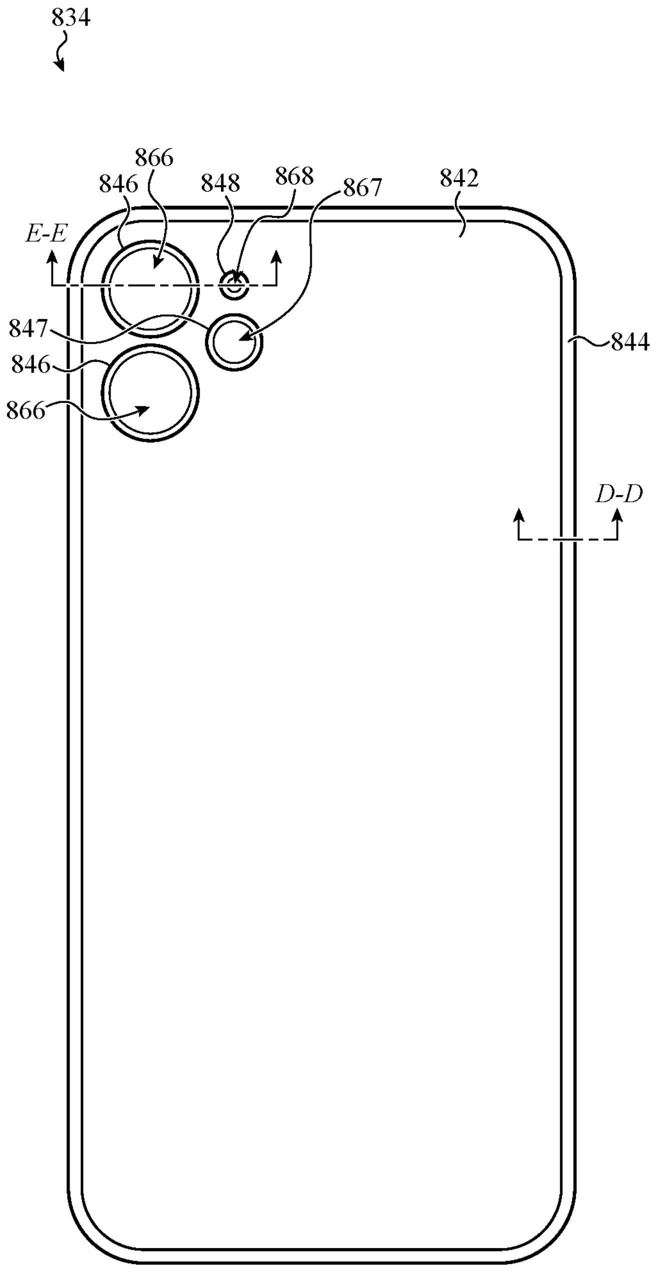
FIG. 8 shows another enclosure component.

FIG. 8 shows another enclosure component for an electronic device. The enclosure component 834 of FIG. 8 may be an example of the rear cover member 134 of FIG. 1B. The enclosure component 834 includes a peripheral region 844 and a region 842 interior to the peripheral region. The region 842 may be positioned over an internal electronic component of the electronic device such as a wireless charging assembly, an antenna component, or the like. In some cases, such as in the example of FIG. 8, the region 842 is a central region of the enclosure component.

As shown in FIG. 8, the enclosure component 834 defines several openings 866, 867, and 868. The openings may be aligned with modules of a sensor assembly. For example, the openings 866 may be aligned with camera modules, the opening 867 may be aligned with a sensor module, and the opening 868 may be aligned with a flash module. Also shown in FIG. 8 are regions 846, 847, and 848 respectively defining and surrounding the openings 866, 867, and 868. Stated differently, the regions 846, 847, and 848 define and extend around a perimeter of the openings 866, 867, and 868. In additional examples, the enclosure component may define a protrusion similar to the protrusion of FIG. 1B and the openings may pass through the protrusion.

As previously described with respect to FIGS. 1A and 1B, all or part of the enclosure component 834 may include a composite material, so that the enclosure component 834 may be a composite enclosure component. The composite material may have a matrix of a glass-based material and one or more nanophases distributed in the matrix. The one or more nanophases may provide one or more of a color or a mechanical property to the composite enclosure component. As previously discussed, each of the one or more nanophases may be in the form of nanoparticles. In embodiments, all or part of the enclosure component 834 may include a composite material having a matrix of a glass-based material and one or more sets of nanoparticles embedded in the matrix. The description of glass-based materials, nanophases, and nanoparticles provided with respect to FIG. 4B is generally applicable herein and is not repeated here.

The internal structure of the region 842 may be suitable for use over an internal electronic component of the electronic device. For example, the internal structure of the region 842 may be configured to have suitable dielectric properties for use over an antenna component, to be suitably non-magnetic for use over a wireless charging component, or both. As examples, the region 842 may be formed from a glass-based material or may be formed from a composite material that includes nanoparticles in a matrix of the glass-based material, wherein the nanoparticles have a size and composition suitable to produce the desired dielectric and/or non-magnetic properties.

In some embodiments, one or more of the peripheral region 844, the region 846, the region 847, or the region 848 may have a different internal structure than the region 842 interior to the peripheral region 844. In some examples, one or more of the peripheral region 844, the region 846, the region 847, or the region 848 includes or is formed of a composite material that has an internal structure that includes at least one nanophase distributed in a matrix of a glass-based material. In some examples, the region 842 may have the internal structure of a glass-based material that lacks the nanophase of one or more of the peripheral region 844, the region 846, the region 847, or the region 848, as shown in FIG. 9D. As previously discussed, the at least one nanophase may be in the form of nanoparticles. In other examples, the region 842 also includes or is formed of a composite material, but the composite material is different from that of one or more of the peripheral region 844, the region 846, the region 847, or the region 848, as shown in the examples of FIGS. 9A, 9B, 9C, and 9E. In some cases, the composite enclosure component may define a sharp transition between the internal structures of the different regions of the enclosure component 834 while in other regions the composite enclosure component may define a graded transition between the internal structures of the different regions.

Figure 9A:
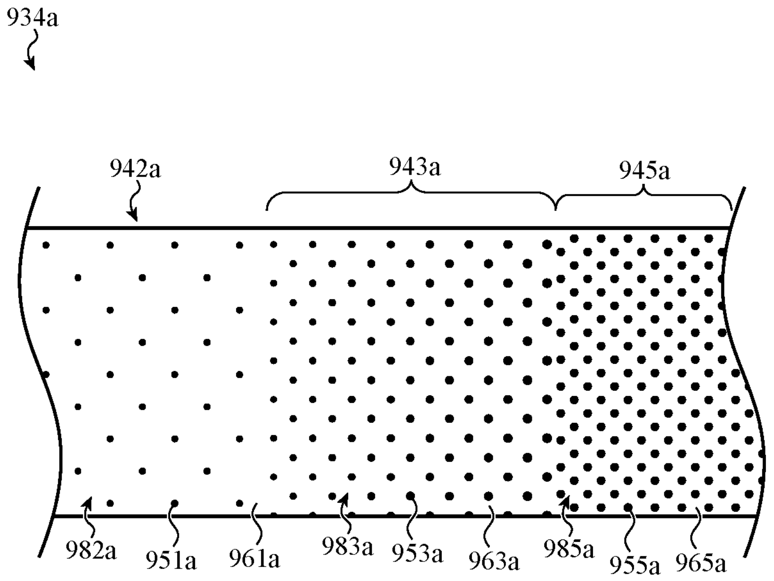
FIG. 9A shows a partial cross-section view of an enclosure component.

FIG. 9A shows a partial cross-section view of an enclosure component for an electronic device. The enclosure component 934*a* of FIG. 9A is a composite enclosure component that includes three regions, a first region 942*a*, second region 943*a*, and a third region 945*a*. The second region 943*a* is positioned between, and contiguous with the first region 942*a* and the third region 945*a*. The composite enclosure component 934*a* may be an example of the enclosure component 834 of FIG. 8, with the cross-section taken along D-D. In some examples, the first region 942*a* is located in the region 842, and the second region 943*a* and the third region 945*a* are located in the region 844.

FIG. 9A schematically shows different composite materials within the three regions 942*a*, 943*a*, and 945*a*. In the example of FIG. 9A, the different composite materials 982*a*, 983*a*, and 985*a* all include the same type of nanoparticles, but the size and the concentration of the nanoparticles is different in the three regions. The first region 942*a* is formed of a composite material 982*a* that includes nanoparticles 951*a* in a matrix of a glass-based material 961*a*. The second region 943*a* is formed of a composite material 983*a* that includes nanoparticles 953*a* in a matrix of a glass-based material 963*a*. The third region 945*a* is formed of a composite material 985*a* that includes nanoparticles 955*a* in a matrix of a glass-based material 965*a*. The first region 942*a* has the lowest concentration of the nanoparticles 951*a*, the third region 945*a* has the highest concentration of the nanoparticles 955*a*, and the second region 943*a* has an intermediate concentration of the nanoparticles 953*a*. In some examples, the nanoparticles 951*a*, 953*a*, and 955*a* are all metallic nanoparticles having substantially the same composition. In other examples, the nanoparticles 951*a*, 953*a*, and 955*a* may be any of the nanoparticles previously described with respect to FIG. 4B.

The nanoparticles 951*a*, 953*a*, and 955*a* in the example of FIG. 9A all have a circular cross-section and may be spherical nanoparticles. The nanoparticles 955*a* have a size (e.g., a diameter) larger than the nanoparticles 951*a*. The nanoparticles 953*a* define a size gradient. In the example of FIG. 9A, the nanoparticles 953*a* near a boundary between the second region 943*a* and the third region 945*a* have a size generally comparable to the size of the nanoparticles 955*a*, the nanoparticles 953*a* near a boundary between the second region 943*a* and the first region 942*a* have a size generally comparable to the size of the nanoparticles 951*a*, and the size of the nanoparticles 953*a* gradually decreases from the boundary between the second region 943*a* and the third region 945*a* to the boundary between the second region 943*a* and the first region 942*a*. The shape of the nanoparticles 951*a*, 953*a*, and 955*a* is not limited to the spherical shape indicated by FIG. 9A and the nanoparticles 951*a*, 953*a*, and 955*a* may have any suitable shape consistent with their composition. The nanoparticles 951*a*, 953*a*, and 955*a* are schematically illustrated in FIG. 9A and have been enlarged for convenience of illustration.

As previously discussed with respect to FIG. 8, the dielectric and/or magnetic properties of the composite material 982*a* of the first region 942*a* may be suitable for use over an internal electronic component of the electronic device. The composite material 985*a* of the third region 945*a* may help increase the toughness of the material, may produce or help to produce a desired color of the composite enclosure component, or both. The composite material 983*a* of the second region 943*a* may provide a transition in the color and/or the toughness between the first region 942*a* and the third region 945*a*.

Figure 9B:
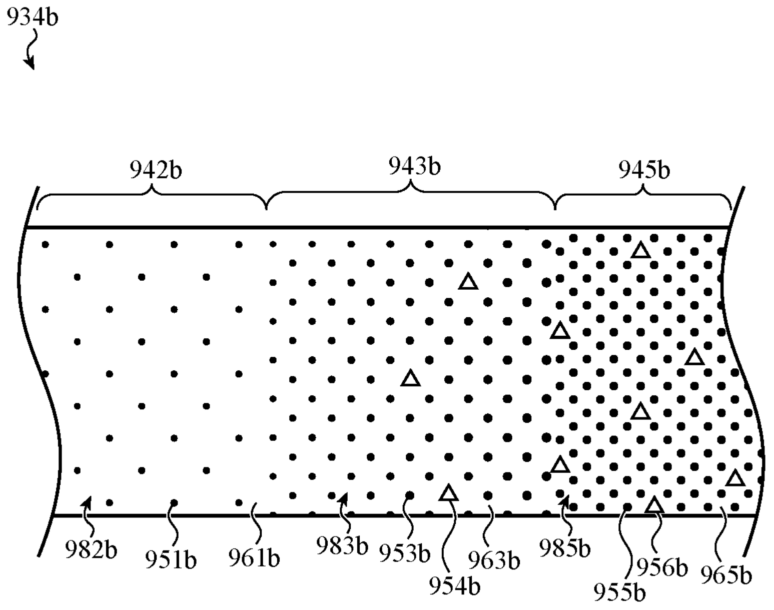
FIG. 9B shows another partial cross-section view of an enclosure component.

FIG. 9B shows another partial cross-section view of an enclosure component. The enclosure component 934*b* of FIG. 9B is another composite enclosure component that includes three regions, a first region 942*b*, second region 943*b*, and a third region 945*b*. The second region 943*b* is positioned between, and contiguous with, the first region 942*b* and the third region 945*b*. The composite enclosure component 934*b* may be an example of the enclosure component 834 of FIG. 8, with the cross-section taken along D-D. In some examples, the first region 942*b* is located in the region 842, and the second region 943*b* and the third region 945*b* are located in the region 844.

FIG. 9B schematically shows different composite materials within the three regions 942*b*, 943*b*, and 945*b*. In the example of FIG. 9B, not all of the composite materials 982*b*, 983*b*, and 985*b* include the same type of nanoparticles. A first type of nanoparticles (951*b*, 953*b*, 955*b*) is shown with a circular cross-section and a second type of nanoparticles (954*b*, 956*b*) is shown with a triangular cross-section. Nanoparticles of the first type of nanoparticles are also referred to herein as first nanoparticles and nanoparticles of the second type are also referred to herein as second nanoparticles. The first type of nanoparticles may differ from the second type of nanoparticles in one or more of composition, shape, size, or combinations of these as previously described with respect to FIG. 5A.

The first region 942*b* is formed of a composite material 982*b* that includes first nanoparticles 951*b* in a glass-based material 961*b*. The second region 943*b* is formed of a composite material 983*b* that includes first nanoparticles 953*b* and second nanoparticles 954*b* in a matrix of a glass-based material 963*b*. The third region 945*b* is formed of a composite material 985*b* that includes first nanoparticles 955*b* and second nanoparticles 956*b* in a matrix of a glass-based material 965*b*. The first region 942*b* has the lowest concentration of the first nanoparticles 951*b*, the third region 945*b* has the highest concentration of the nanoparticles 955*b*, and the second region 943*b* has an intermediate concentration of the nanoparticles 953*b*. The first region 942*b* does not include the second nanoparticles and the third region 945*b* has a concentration of the second nanoparticles 956*b* that is higher than a concentration of the second nanoparticles 954*b* in the second region 943*b*. In some examples, the nanoparticles 951*b*, 953*b*, and 955*b* are all metallic nanoparticles having substantially the same composition. The nanoparticles 954*b* and 956*b* may be other than metallic nanoparticles and in some cases may be semiconductor or ceramic particles. In other examples, the nanoparticles 951*b*, 953*b*, and 955*b* may be any of the nanoparticles previously described with respect to FIG. 4B.

The first nanoparticles 951*b*, 953*b*, and 955*b* in the example of FIG. 9B all have a circular cross-section and may be spherical nanoparticles. The first nanoparticles 955*b* have a size (e.g., a diameter) larger than the first nanoparticles 951*b*. The first nanoparticles 953*b* define a size gradient in a similar fashion as previously described with respect to FIG. 9A. The shape of the nanoparticles 951*b*, 953*b*, and 955*b* is not limited to the spherical shape indicated by FIG. 9B and the first nanoparticles 951*b*, 953*b*, and 955*b* may have any suitable shape consistent with their composition.

The second nanoparticles 954*b* and 956*b* have a triangular cross-section. The triangular cross-section is selected for convenience of illustration and the second nanoparticles 954*b* and 956*b* may have any suitable shape, such as an angular shape or a rounded shape such as a spherical shape. In the example of FIG. 9B, the second nanoparticles 954*b* are not distributed uniformly in the second region 943*b*, but instead the second nanoparticles 954*b* are present in a subregion that extends from the boundary between the second region 943*b* and the third region 945*b* to a distance that is less than the distance between this boundary and the boundary between second region 943*b* and the first region 942*b*. In the example of FIG. 9B, the second nanoparticles 954*b* have a size that is similar to a size of the second nanoparticles 956*b*. However, this example is not limiting and in other examples the size of the second nanoparticles 954*b* may be generally smaller than the nanoparticles 956*b* or may generally decrease with increasing distance from the boundary between the second region 943*b* and the third region 945*b*. The nanoparticles 951*b*, 953*b*, 955*b*, 954*b*, and 956*b* are schematically illustrated in FIG. 9B and have been enlarged for convenience of illustration.

As previously discussed with respect to FIG. 8, the dielectric and/or magnetic properties of the composite material 982*b* of the first region 942*b* may be suitable for use over an internal electronic component of the electronic device. The composite material 985*b* of the third region 945*b* may help increase the toughness of the material, may produce or help to produce a desired color of the composite enclosure component, or both. The composite material 983*b* of the second region 943*b* may provide a transition in the color and/or the toughness between the first region 942*b* and the third region 945*b*.

Figure 9C:
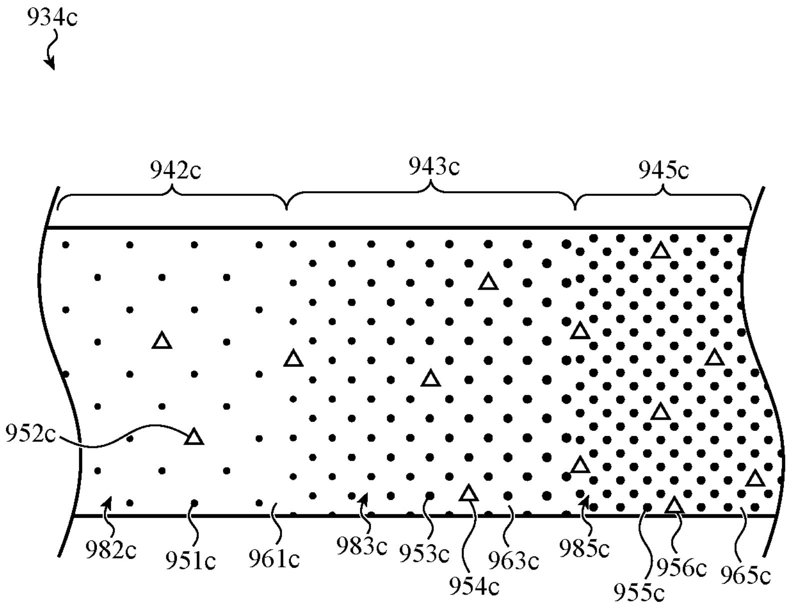
FIG. 9C shows another partial cross-section view of an enclosure component.
Figure 9D:
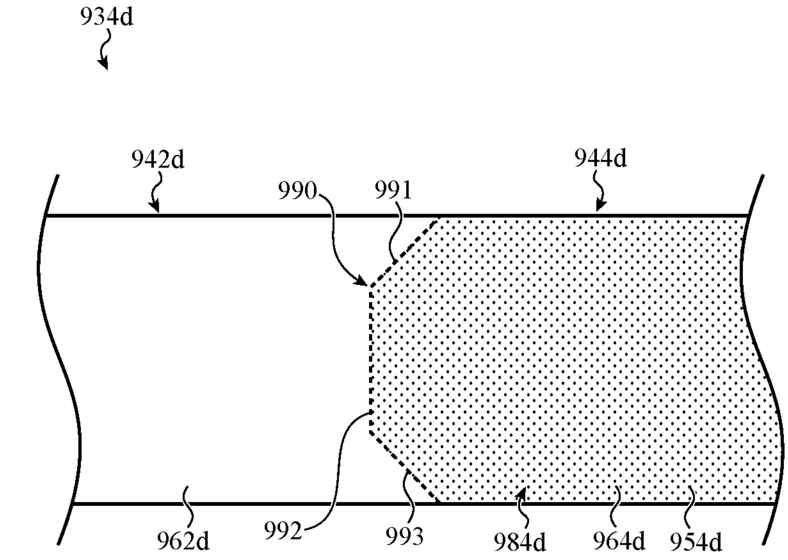
FIG. 9D shows another partial cross-section view of an enclosure component.

FIG. 9C shows another partial cross-section view of an enclosure component. The composite enclosure component 934*c* of FIG. 9C is another composite enclosure component that includes three regions, a first region 942*c*, second region 943*c*, and a third region 945*c*. The second region 943*c* is positioned between, and contiguous with, the first region 942*c* and the third region 945*c*. The composite enclosure component 934*c* may be an example of the enclosure component 834 of FIG. 8, with the cross-section taken along D-D. In some examples, the first region 942*c* is located in the region 842, and the second region 943*c* and the third region 945*c* are located in the region 844.

FIG. 9C schematically shows different composite materials within the three regions 942*c*, 943*c*, and 945*c*. In the example of FIG. 9C, each of the composite materials 982*c*, 983*c*, and 985*c* includes two types of nanoparticles. A first type of nanoparticles (951*c*, 953*c*, 955*c*) is shown with a circular cross-section and a second type of nanoparticles (952*c*, 954*c*, 956*c*) is shown with a triangular cross-section. Nanoparticles of the first type of nanoparticles are also referred to herein as first nanoparticles and nanoparticles of the second type are also referred to herein as second nanoparticles. The first type of nanoparticles may differ from the second type of nanoparticles in one or more of composition, shape, size, or combinations of these as previously described with respect to FIGS. 5A and 9B.

The first region 942*c* is formed of a composite material 982*c* that includes first nanoparticles 951*c* and second nanoparticle 952*c* in a glass-based material 961*c*. The second region 943*c* is formed of a composite material 983*c* that includes first nanoparticles 953*c* and second nanoparticles 954*c* in a matrix of a glass-based material 963*c*. The third region 945*c* is formed of a composite material 985*c* that includes first nanoparticles 955*c* and second nanoparticles 956*c* in a matrix of a glass-based material 965*c*. The first region 942*c* has the lowest concentration of the first nanoparticles 951*c*, the third region 945*c* has the highest concentration of the nanoparticles 955*c*, and the second region 943*c* has an intermediate concentration of the nanoparticles 953*c*. In some examples, the nanoparticles 951*c*, 953*c*, and 955*c* are all metallic nanoparticles having substantially the same composition. The nanoparticles 952*c*, 954*c* and 956*c* may be other than metallic nanoparticles and in some cases may be semiconductor or ceramic particles. In other examples, the nanoparticles 951*c*, 953*c*, and 955*c* may be any of the nanoparticles previously described with respect to FIG. 4B.

The first nanoparticles 951*c*, 953*c*, and 955*c* in the example of FIG. 9C all have a circular cross-section and may be spherical nanoparticles. The first nanoparticles 955*c* have a size (e.g., a diameter) larger than the first nanoparticles 951*c*. The first nanoparticles 953*c* define a size gradient, in a similar fashion as previously described with respect to FIG. 9A. The shape of the nanoparticles 951*c*, 953*c*, and 955*c* is not limited to the spherical shape indicated by FIG. 9C and the first nanoparticles 951*c*, 953*c*, and 955*c* may have any suitable shape consistent with their composition.

The second nanoparticles 954*c* and 956*c* all have a triangular cross-section. The triangular cross-section is selected for convenience of illustration and the second nanoparticles 954*c* and 956*c* may have any suitable shape, such as an angular shape or a rounded shape such as a spherical shape. In the example of FIG. 9C, a concentration of the second nanoparticles 954*c* is higher in the third region 945*c* than a concentration of the second nanoparticles 952*c* in the first region 952*c*. In some cases, the second nanoparticles 952*c* are not distributed uniformly in the first region 942*c*, but instead are present in a subregion that extends from the boundary between the first region 942*c* and the second region 943*c* to a distance that is less than a width of the first region 942*c*. In the example of FIG. 9C, the second nanoparticles 952*c*, 954*c*, and 956*c* have a size that is generally similar. However, this example is not limiting and in other examples the size of the second nanoparticle may define a gradient, such as a general decrease in size with increasing distance from the boundary between the second region 943*c* and the third region 945*c*. The nanoparticles 951*c*, 953*c*, 955*c*, 952*c*, 954*c*, and 956*c* are schematically illustrated in FIG. 9C and have been enlarged for convenience of illustration.

As previously discussed with respect to FIG. 8, the dielectric and/or magnetic properties of the composite material 982*c* of the first region 942*c* may be suitable for use over an internal electronic component of the electronic device. The composite material 985*c* of the third region 945*c* may help increase the toughness of the material, may produce or help to produce a desired color of the composite enclosure component, or both. The composite material 983*c* of the second region 943*c* may provide a transition in the color and/or the toughness between the first region 942*c* and the third region 945*c*.

FIG. 9D shows another partial cross-section view of an enclosure component. The enclosure component 934*d* of FIG. 9D is a composite enclosure component that includes two regions, a first region 942*d* and a second region 944*d*. The dashed line schematically indicates a boundary 990 between the first region 942*d* and the second region 944*d*. In contrast to the example of FIG. 7A, the boundary 990 is not simply perpendicular to the front and rear surfaces of the composite enclosure component. Instead, the upper portion 991 and the lower portion 993 of the boundary 990 each extend from the front and rear surfaces of the composite enclosure component at an acute angle (as measured in the first region 942*d*). The central portion of the boundary 992 has a vertical orientation. The composite enclosure component 934*d* may be an example of the enclosure component 834 of FIG. 8, with the cross-section taken along D-D, the first region 942*d* being located in the region 842, and the second region 944*d* being located in the region 844. Alternately, the composite enclosure component 934*d* may be an example of the enclosure component 632 of FIG. 6, with the first region 942*d* being located in the region 842, and the second region 944*d* being located in the region 844.

As shown in FIG. 9D, the second region 944*d* is formed of a composite material 984*d* that includes nanoparticles 954*d* in a matrix of a glass-based material 964*d*. The first region 942*d* is formed of a glass-based material 962*d* and is free of the nanoparticles 954*d*. As previously discussed with respect to FIGS. 6 and 8, the optical, dielectric and/or magnetic properties of the glass-based material 962*d* of the first region 942*d* may be suitable for use over an internal electronic component of the electronic device. The composite material 984*d* of the second region 944*d* may help increase the toughness of the material, may produce or help to produce a desired color of the composite enclosure component, or both. When the composite material 984*d* helps to produce a desired color of the composite enclosure component, the shape of the boundary 990 may produce a depth of color effect. The nanoparticles 954*d* are schematically illustrated in FIG. 9D and have been enlarged for convenience of illustration. The nanoparticles 954*d* may be any of the nanoparticles previously described with respect to FIG. 4B.

Figure 9E:
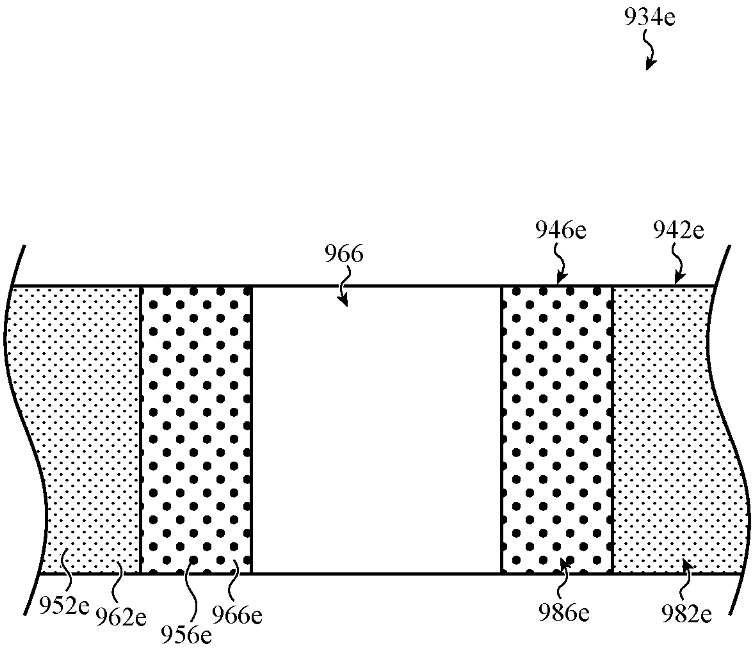
FIG. 9E shows another partial cross-section view of an enclosure component.

FIG. 9E shows another partial cross-section view of an enclosure component. The composite enclosure component 934*e* of FIG. 9E includes two regions, a first region 942*e* and a second region 946*e*. The second region 946*e* surrounds an opening 966 in the enclosure component. Stated differently, the second region 946*e* defines and extends around a perimeter of the opening 966. The composite enclosure component 934*e* may be an example of the enclosure component 834 of FIG. 8, with the cross-section taken along D-D, the first region 942*e* being located in the region 842, and the second region 946*e* being located in the region 846. Therefore, the second region 946*e* may surround an opening for a camera module.

FIG. 9E schematically shows different composite materials within the two regions 942*e* and 946*e*. In the example of FIG. 9A, the different composite materials 982*e* and 986*e* include nanoparticles of different sizes. The first region 942*e* is formed of a composite material 982*e* that includes nanoparticles 952*e* in a glass-based material 962*e*. The second region 946*e* is formed of a composite material 986*e* that includes nanoparticles 956*e* in a matrix of a glass-based material 966*e*. The nanoparticles 952*e* of first region 942*e* are smaller in size than the size of the nanoparticles 956*e* of the second region 946*e*. In some examples, the nanoparticles 952*e* and the nanoparticles 956*e* are metallic nanoparticles having substantially the same composition. In other examples, the nanoparticles 952*e* and the nanoparticles 956*e* may be any of the nanoparticles previously described with respect to FIG. 4B. The shape of the nanoparticles 952*e* and 956*e* is not limited to the spherical shape indicated by FIG. 9E and the nanoparticles 952*e* and 956*e* and may have any suitable shape consistent with their composition. The nanoparticles 952*e* are schematically illustrated in FIG. 9E and have been enlarged for convenience of illustration.

As previously discussed with respect to FIG. 8, the composite material 986*e* of the second region 946*e* may help increase the toughness of the material, may produce or help to produce a desired color of the composite enclosure component, or both. When the composite material 986*e* helps to increase the toughness of the material, the composite material can help prevent propagation of cracks from the opening 966 in the composite enclosure component 934*e*.

Figure 10:
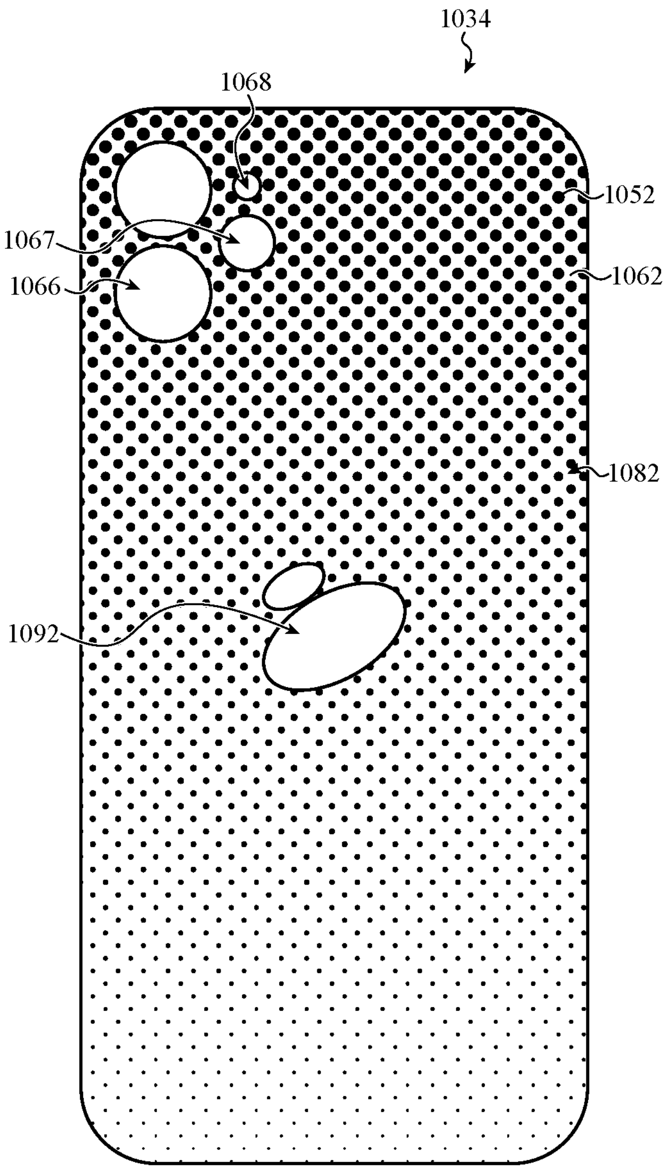
FIG. 10 shows another enclosure component.

FIG. 10 shows another enclosure component. The enclosure component 1034 of FIG. 10 is a composite enclosure component that includes a composite material 1082. The composite material includes nanoparticles 1052 in a matrix of a glass-based material 1062. The nanoparticles 1052 are larger in an upper portion of the composite enclosure component 1034 of FIG. 10 (e.g., the portion that extends around the openings 1066, 1067, and 1068) than in a lower portion of the composite enclosure component 1034. Furthermore, the nanoparticles define a size gradient that decreases from the upper portion to the lower portion of the composite enclosure component. The size gradient also defines a concentration gradient in the example of FIG. 10. The shape of the nanoparticles 1052 is not limited to the spherical shape indicated by FIG. 10 and the nanoparticles 1052 may have any suitable shape consistent with their composition. The nanoparticles 1052 are schematically illustrated in FIG. 10 and have been enlarged for convenience of illustration. The nanoparticles 1052 may be any of the nanoparticles previously described with respect to FIG. 4B.

The composite material 1082 may help increase the toughness of the material, may produce or help to produce a desired color of the composite enclosure component, or both. As shown in FIG. 10, the composite material 1082 defines a majority of the composite enclosure component 1034 except for the region where the graphic 1092 is located. The graphic may be formed along an interior surface of this region, such as by deposition of a coating along the interior surface.

In some cases, the graphic 1092 is formed along an interior surface of a region of the composite enclosure component 1034 that is free of the nanoparticles 1052. For example, nanoparticles may be prevented from forming in this region of the composite enclosure component or nanoparticles may be dissolved in this region. In other examples, the graphic may be formed within the region of the composite enclosure component by increasing the size of the nanoparticles until they join together. As an additional example, the graphic 1092 may be formed along an interior surface of a region of the composite enclosure component that includes the nanoparticles 1052 so long as the composite material 1082 allows the graphic to be visible to a user.

Figure 11:
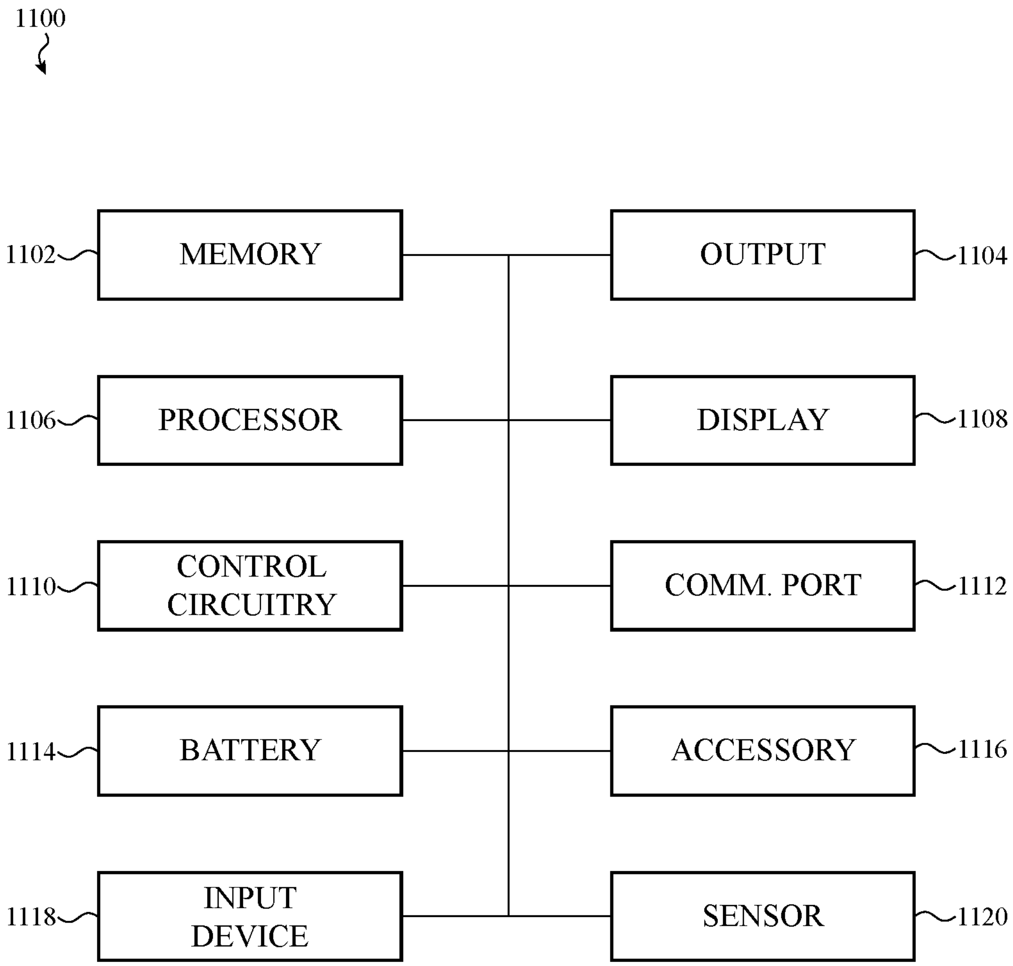
FIG. 11 shows a block diagram of a sample electronic device

FIG. 11 shows a block diagram of a sample electronic device including a composite enclosure component as described herein. The schematic representation depicted in FIG. 11 may correspond to the devices depicted in FIGS. 1A to 1B as described above. However, FIG. 11 may also more generally represent other types of electronic devices including a component comprising a composite material as described herein.

In embodiments, an electronic device 1100 may include sensors 1120 to provide information regarding configuration and/or orientation of the electronic device in order to control the output of the display. For example, a portion of the display 1108 may be turned off, disabled, or put in a low energy state when all or part of the viewable area of the display 1108 is blocked or substantially obscured. As another example, the display 1108 may be adapted to rotate the display of graphical output based on changes in orientation of the device 1100 (e.g., 90 degrees or 180 degrees) in response to the device 1100 being rotated.

The electronic device 1100 also includes a processor 1106 operably connected with a computer-readable memory 1102. The processor 1106 may be operatively connected to the memory 1102 component via an electronic bus or bridge. The processor 1106 may be implemented as one or more computer processors or microcontrollers configured to perform operations in response to computer-readable instructions. The processor 1106 may include a central processing unit (CPU) of the device 1100. Additionally, and/or alternatively, the processor 1106 may include other electronic circuitry within the device 1100 including application specific integrated chips (ASIC) and other microcontroller devices. The processor 1106 may be configured to perform functionality described in the examples above.

The memory 1102 may include a variety of types of non-transitory computer-readable storage media, including, for example, read access memory (RAM), read-only memory (ROM), erasable programmable memory (e.g., EPROM and EEPROM), or flash memory. The memory 1102 is configured to store computer-readable instructions, sensor values, and other persistent software elements.

The electronic device 1100 may include control circuitry 1110. The control circuitry 1110 may be implemented in a single control unit and not necessarily as distinct electrical circuit elements. As used herein, "control unit" will be used synonymously with "control circuitry." The control circuitry 1110 may receive signals from the processor 1106 or from other elements of the electronic device 1100.

As shown in FIG. 11, the electronic device 1100 includes a battery 1114 that is configured to provide electrical power to the components of the electronic device 1100. The battery 1114 may include one or more power storage cells that are linked together to provide an internal supply of electrical power. The battery 1114 may be operatively coupled to power management circuitry that is configured to provide appropriate voltage and power levels for individual components or groups of components within the electronic device 1100. The battery 1114, via power management circuitry, may be configured to receive power from an external source, such as an alternating current power outlet. The battery 1114 may store received power so that the electronic device 1100 may operate without connection to an external power source for an extended period of time, which may range from several hours to several days.

In some embodiments, the electronic device 1100 includes one or more input devices 1118. The input device 1118 is a device that is configured to receive input from a user or the environment. The input device 1118 may include, for example, a push button, a touch-activated button, a capacitive touch sensor, a touch screen (e.g., a touch-sensitive display or a force-sensitive display), a capacitive touch button, dial, crown, or the like. In some embodiments, the input device 1118 may provide a dedicated or primary function, including, for example, a power button, volume buttons, home buttons, scroll wheels, and camera buttons.

The device 1100 may also include one or more sensors or sensor modules 1120, such as a force sensor, a capacitive sensor, an accelerometer, a barometer, a gyroscope, a proximity sensor, a light sensor, or the like. In some cases, the device 1100 includes a sensor array (also referred to as a sensing array) which includes multiple sensors 1120. For example, a sensor array associated with a protruding feature of a cover member may include an ambient light sensor, a Lidar sensor, and a microphone. As previously discussed with respect to FIGS. 1B and 2, one or more camera modules may also be associated with the protruding feature. The sensors 1120 may be operably coupled to processing circuitry. In some embodiments, the sensors 1120 may detect deformation and/or changes in configuration of the electronic device and be operably coupled to processing circuitry that controls the display based on the sensor signals. In some implementations, output from the sensors 1120 is used to reconfigure the display output to correspond to an orientation or folded/unfolded configuration or state of the device. Example sensors 1120 for this purpose include accelerometers, gyroscopes, magnetometers, and other similar types of position/orientation sensing devices. In addition, the sensors 1120 may include a microphone, an acoustic sensor, a light sensor (including ambient light, infrared (IR) light, ultraviolet (UV) light), an optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

In some embodiments, the electronic device 1100 includes one or more output devices 1104 configured to provide output to a user. The output device 1104 may include a display 1108 that renders visual information generated by the processor 1106. The output device 1104 may also include one or more speakers to provide audio output. The output device 1104 may also include one or more haptic devices that are configured to produce a haptic or tactile output along an exterior surface of the device 1100.

The display 1108 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1108 is a liquid-crystal display or an electrophoretic ink display, the display 1108 may also include a backlight component that can be controlled to provide variable levels of display brightness. If the display 1108 is an organic light-emitting diode or an organic electroluminescent-type display, the brightness of the display 1108 may be controlled by modifying the electrical signals that are provided to display elements. In addition, information regarding configuration and/or orientation of the electronic device may be used to control the output of the display as described with respect to input devices 1118. In some cases, the display is integrated with a touch and/or force sensor in order to detect touches and/or forces applied along an exterior surface of the device 1100.

The electronic device 1100 may also include a communication port 1112 that is configured to transmit and/or receive signals or electrical communication from an external or separate device. The communication port 1112 may be configured to couple to an external device via a cable, adaptor, or other type of electrical connector. In some embodiments, the communication port 1112 may be used to couple the electronic device 1100 to a host computer.

The electronic device 1100 may also include at least one accessory 1116, such as a camera, a flash for the camera, or other such device. The camera may be part of a camera array or sensing array that may be connected to other parts of the electronic device 1100 such as the control circuitry 1110.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As referred to herein, a composition that is substantially free of one or more elements or compounds may contain only an incidental amount of the element or compound. In some examples, the composition may include less than 0.1 at % of the element or compound.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
a display; and
an enclosure comprising:
a housing defining a side surface of the enclosure; and
a cover assembly coupled to the housing, a composite cover member of the cover assembly defining:
a central region positioned over the display and comprising a first glass-based material; and
a peripheral region at least partially surrounding the central region and comprising a second glass-based material and nanoparticles embedded in the second glass-based material, the peripheral region having a greater concentration of the nanoparticles than the central region.

2. The electronic device of claim 1 further comprising a front sensing array, wherein:
the nanoparticles include a set of metallic nanoparticles that impart a color to the peripheral region; and
the cover assembly defines a window for the front sensing array that is substantially free of the metallic nanoparticles.

3. The electronic device of claim 2, wherein:
the central region is substantially free of the metallic nanoparticles; and
the composite cover member further comprises an intermediate region configured to provide a transition in an optical property between the central region and the peripheral region.

4. The electronic device of claim 1, wherein the nanoparticles include a set of non-metallic nanoparticles.

5. The electronic device of claim 4, wherein the non-metallic nanoparticles are semiconductor nanoparticles.

6. The electronic device of claim 1, wherein the nanoparticles include metallic nanoparticles and semiconductor nanoparticles.

7. The electronic device of claim 1, wherein a hardness of the peripheral region is greater than a hardness of the central region.

8. An electronic device comprising:
a display;
a radio-frequency antenna assembly; and
an enclosure surrounding the display and the radio-frequency antenna assembly and comprising:
a housing defining a side surface of the enclosure; and
a rear cover coupled to the housing and including a composite cover member comprising:
a first region positioned over the radio-frequency antenna assembly and comprising a first glass-based material; and
a second region surrounding the first region and comprising a second glass-based material and a set of nanoparticles dispersed in the second glass-based material, the second region having a greater dielectric constant than the first region due, at least in part, to the set of nanoparticles.

9. The electronic device of claim 8, wherein:
the set of nanoparticles is a second set of metallic nanoparticles defining a second concentration of the metallic nanoparticles;
the first region includes a first set of the metallic nanoparticles defining a first concentration, less than the second concentration, of the metallic nanoparticles; and
the second region has a different color than the first region.

10. The electronic device of claim 9, wherein the first region of the composite cover member has a dielectric constant ranging from 5.5 to 7.5.

11. The electronic device of claim 9, wherein:
the composite cover member further comprises a third region between the first region and the second region; and
the third region comprises a third set of the metallic nanoparticles defining a third concentration, greater than the first concentration and less than the second concentration, of the metallic nanoparticles.

12. The electronic device of claim 11, wherein the third set of the metallic nanoparticles defines a concentration gradient that decreases from the second concentration to the first concentration.

13. The electronic device of claim 8, wherein the nanoparticles include non-metallic nanoparticles.

14. The electronic device of claim 8, wherein each of the first glass-based material and the second glass-based material is a silicate-based glass material.

15. An electronic device comprising:
an enclosure comprising a composite cover member defining:
a first region comprising a first glass material; and
a second region including a set of nanoparticles dispersed in a second glass material, the second region having a greater toughness than the first region due at least in part to the set of nanoparticles; and
an electronic component positioned within the enclosure and at least partially positioned below the first region.

16. The electronic device of claim 15, wherein:
the set of nanoparticles includes nanoparticles formed from a metal; and
a concentration of the metal in the composite cover member ranges from greater than 5 mol % to 10 mol %.

17. The electronic device of claim 16, wherein:
the electronic component is a sensor assembly comprising an optical module;
the first region is positioned over the optical module of the sensor assembly and is substantially free of the nanoparticles; and
the second region surrounds the first region.

18. The electronic device of claim 17, wherein:
the composite cover member is a front cover member of the enclosure; and
the sensor assembly is a front-facing sensor assembly.

19. The electronic device of claim 15, wherein:
the composite cover member is a rear cover member of the enclosure and defines a protruding feature and an opening extending through the protruding feature;
the electronic component is a rear-facing camera assembly;
an optical module of the rear-facing camera assembly extends into the opening;
the second region of the composite cover member surrounds the opening; and
the first region of the composite cover member surrounds the second region.

20. The electronic device of claim 15, wherein the composite cover member is chemically strengthened.

* * * * *